United States Patent [19]
Nouri et al.

[11] Patent Number: 6,138,250
[45] Date of Patent: Oct. 24, 2000

[54] SYSTEM FOR READING SYSTEM LOG

[75] Inventors: Ahmad Nouri, San Jose; Karl S. Johnson, Palo Alto, both of Calif.

[73] Assignee: Micron Electronics, Inc., Nampa, Id.

[21] Appl. No.: 08/942,070

[22] Filed: Oct. 1, 1997

Related U.S. Application Data

[60] Provisional application No. 60/046,326, May 13, 1997, provisional application No. 60/046,397, May 13, 1997, provisional application No. 60/047,016, May 13, 1997, and provisional application No. 60/046,416, May 13, 1997.

[51] Int. Cl.[7] .................................................. G06F 11/30
[52] U.S. Cl. ........................... 714/31; 709/224; 709/225
[58] Field of Search ........................ 395/200.54, 200.55; 709/224, 225; 714/31

[56] References Cited

U.S. PATENT DOCUMENTS

| | | | |
|---|---|---|---|
| 4,057,847 | 11/1977 | Lowell et al. | 364/200 |
| 4,449,182 | 5/1984 | Rubinson et al. | 364/200 |
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. . | |
| 4,769,764 | 9/1988 | Levanon | 364/708 |
| 4,774,502 | 9/1988 | Kimura | 340/501 |
| 4,835,737 | 5/1989 | Herrig et al. . | |
| 4,949,245 | 8/1990 | Martin et al. . | |
| 4,999,787 | 3/1991 | McNally et al. . | |
| 5,006,961 | 4/1991 | Monico . | |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,121,500 | 6/1992 | Arlington et al. | 395/750 |
| 5,123,017 | 6/1992 | Simpkins et al. | 371/15.1 |
| 5,136,708 | 8/1992 | Lapourtre et al. | 395/650 |
| 5,138,619 | 8/1992 | Fasang et al. | 371/21.1 |
| 5,157,663 | 10/1992 | Major et al. | 371/9.1 |
| 5,210,855 | 5/1993 | Bartol . | |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,261,094 | 11/1993 | Everson et al. | 395/600 |
| 5,266,838 | 11/1993 | Gerner | 307/19 |
| 5,269,011 | 12/1993 | Yanai et al. . | |
| 5,272,382 | 12/1993 | Heald et al. | 307/66 |
| 5,272,584 | 12/1993 | Austruy et al. . | |

(List continued on next page.)

FOREIGN PATENT DOCUMENTS 0 866 403 A1  9/1998  European Pat. Off. .

OTHER PUBLICATIONS

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

Davis, T, Usenet post to alt.msdos.programmer, Apr. 1997, "Re: How do I create an FDISK batch file?".

(List continued on next page.)

*Primary Examiner*—Zarni Maung
*Assistant Examiner*—Saleh Najjar
*Attorney, Agent, or Firm*—Knobbe, Martens, Olson & Bear LLP

[57] ABSTRACT

A fault tolerant computer system for downloading the contents of a server system log through either a local or remote client machine without intervention of the server operating system software. The remote machine accesses the server by use of a dial-in modem connection, while the local machine accesses the server by a local serial connection. The system log may be stored in a non-volatile RAM which is powered by a remote interface if the server power is off. The downloaded information is displayed in a graphical user interface window to enable diagnosis and recovery of the server.

38 Claims, 26 Drawing Sheets

U.S. PATENT DOCUMENTS

| | | | |
|---|---|---|---|
| 5,276,863 | 1/1994 | Heider | 395/575 |
| 5,280,621 | 1/1994 | Barnes et al. | 395/800 |
| 5,283,905 | 2/1994 | Saadeh et al. | 395/750 |
| 5,307,354 | 4/1994 | Cramer et al. | 371/11.2 |
| 5,311,451 | 5/1994 | Barrett | 364/550 |
| 5,317,693 | 5/1994 | Cuenod et al. . | |
| 5,329,625 | 7/1994 | Kannan et al. . | |
| 5,337,413 | 8/1994 | Lui et al. . | |
| 5,351,276 | 9/1994 | Doll, Jr. et al. . | |
| 5,367,670 | 11/1994 | Ward et al. | 395/575 |
| 5,379,184 | 1/1995 | Barraza et al. | 361/685 |
| 5,379,409 | 1/1995 | Ishikawa | 395/575 |
| 5,386,567 | 1/1995 | Lien et al. . | |
| 5,388,267 | 2/1995 | Chan et al. | 395/700 |
| 5,402,431 | 3/1995 | Saadeh et al. | 371/67.1 |
| 5,404,494 | 4/1995 | Garney . | |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,440,748 | 8/1995 | Sekine et al. . | |
| 5,455,933 | 10/1995 | Schieve et al. | 395/183.03 |
| 5,463,766 | 10/1995 | Schieve et al. | 395/650 |
| 5,471,617 | 11/1995 | Farrand et al. | 395/700 |
| 5,473,499 | 12/1995 | Weir | 361/58 |
| 5,483,419 | 1/1996 | Kaczeus, Sr. et al. . | |
| 5,485,550 | 1/1996 | Dalton | 395/51 |
| 5,485,607 | 1/1996 | Lomet et al. | 395/600 |
| 5,487,148 | 1/1996 | Komori et al. | 395/182.02 |
| 5,491,791 | 2/1996 | Glowny et al. | 395/183.13 |
| 5,493,574 | 2/1996 | McKinley . | |
| 5,493,666 | 2/1996 | Fitch . | |
| 5,513,314 | 4/1996 | Kandasamy et al. | 395/182.04 |
| 5,517,646 | 5/1996 | Piccirillo et al. . | |
| 5,526,289 | 6/1996 | Dinh et al. | 364/557 |
| 5,528,409 | 6/1996 | Cucci et al. | 359/171 |
| 5,535,326 | 7/1996 | Baskey et al. | 395/182.02 |
| 5,546,272 | 8/1996 | Moss et al. | 361/687 |
| 5,548,712 | 8/1996 | Larson et al. | 395/182.05 |
| 5,555,510 | 9/1996 | Verseput et al. . | |
| 5,559,764 | 9/1996 | Chen et al. | 396/30 |
| 5,559,958 | 9/1996 | Farrand et al. | 395/183.03 |
| 5,559,965 | 9/1996 | Oztaskin et al. . | |
| 5,564,024 | 10/1996 | Pemberton . | |
| 5,566,339 | 10/1996 | Perholtz et al. | 395/750 |
| 5,568,610 | 10/1996 | Brown . | |
| 5,568,619 | 10/1996 | Blackledge et al. . | |
| 5,572,403 | 11/1996 | Mills | 361/695 |
| 5,577,205 | 11/1996 | Hwang et al. . | |
| 5,579,487 | 11/1996 | Meyerson et al. | 395/280 |
| 5,579,491 | 11/1996 | Jeffries et al. . | |
| 5,581,712 | 12/1996 | Herrman . | |
| 5,581,714 | 12/1996 | Amini et al. . | |
| 5,584,030 | 12/1996 | Husak et al. | 395/750 |
| 5,588,144 | 12/1996 | Inoue et al. . | |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,604,873 | 2/1997 | Fite et al. | 395/283 |
| 5,606,672 | 2/1997 | Wade . | |
| 5,608,876 | 3/1997 | Cohen et al. . | |
| 5,615,207 | 3/1997 | Gephardt et al. . | |
| 5,621,159 | 4/1997 | Brown et al. | 73/9 |
| 5,621,892 | 4/1997 | Cook | 395/200.1 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,630,076 | 5/1997 | Saulpaugh et al. | 395/284 |
| 5,631,847 | 5/1997 | Kikinis | 364/514 R |
| 5,632,021 | 5/1997 | Jennings et al. . | |
| 5,638,289 | 6/1997 | Yamada et al. . | |
| 5,644,470 | 7/1997 | Benedict et al. . | |
| 5,644,731 | 7/1997 | Liencres et al. . | |
| 5,651,006 | 7/1997 | Fujino et al. . | |
| 5,652,832 | 7/1997 | Kane et al. . | |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,081 | 8/1997 | Bonnell et al. | 395/200.32 |
| 5,655,083 | 8/1997 | Bagley | 395/182.31 |
| 5,655,148 | 8/1997 | Richman et al. . | |
| 5,659,682 | 8/1997 | Devarakonda et al. . | |
| 5,664,118 | 9/1997 | Nishigaki et al. | 395/283 |
| 5,664,119 | 9/1997 | Jeffries et al. . | |
| 5,666,538 | 9/1997 | DeNicola . | |
| 5,668,992 | 9/1997 | Hammer et al. | 395/651 |
| 5,669,009 | 9/1997 | Buktenica et al. | 395/800.35 |
| 5,671,371 | 9/1997 | Kondo et al. | 395/306 |
| 5,675,723 | 10/1997 | Ekrot et al. . | |
| 5,680,288 | 10/1997 | Carey et al. . | |
| 5,684,671 | 11/1997 | Hobbs et al. . | |
| 5,689,637 | 11/1997 | Johnson et al. | 395/183.22 |
| 5,696,899 | 12/1997 | Kalwitz . | |
| 5,696,949 | 12/1997 | Young | 395/551 |
| 5,696,970 | 12/1997 | Sandage et al. . | |
| 5,704,031 | 12/1997 | Mikami et al. | 395/182.02 |
| 5,715,456 | 2/1998 | Bennett et al. | 395/652 |
| 5,724,529 | 3/1998 | Smith et al. . | |
| 5,726,506 | 3/1998 | Wood . | |
| 5,727,207 | 3/1998 | Gates et al. | 395/651 |
| 5,732,266 | 3/1998 | Moore et al. | 395/651 |
| 5,737,708 | 4/1998 | Grob et al. | 455/557 |
| 5,740,378 | 4/1998 | Rehl et al. . | |
| 5,742,514 | 4/1998 | Bonola | 364/492 |
| 5,742,833 | 4/1998 | Dea et al. | 395/750.05 |
| 5,747,889 | 5/1998 | Raynham et al. . | |
| 5,748,426 | 5/1998 | Bedingfield et al. . | |
| 5,752,164 | 5/1998 | Jones | 455/33.1 |
| 5,754,797 | 5/1998 | Takahashi . | |
| 5,758,165 | 5/1998 | Shuff | 395/712 |
| 5,758,352 | 5/1998 | Reynolds et al. | 707/200 |
| 5,761,033 | 6/1998 | Wilhelm . | |
| 5,761,045 | 6/1998 | Olson et al. . | |
| 5,761,085 | 6/1998 | Giorgio | 364/505 |
| 5,761,462 | 6/1998 | Neal et al. . | |
| 5,764,968 | 6/1998 | Ninomiya . | |
| 5,765,008 | 6/1998 | Desai et al. . | |
| 5,765,198 | 6/1998 | McCrocklin et al. . | |
| 5,767,844 | 6/1998 | Stoye | 345/212 |
| 5,768,541 | 6/1998 | Pan-Ratzlaff . | |
| 5,768,542 | 6/1998 | Enstrom et al. . | |
| 5,774,741 | 6/1998 | Choi . | |
| 5,777,897 | 7/1998 | Giorgio | 364/557 |
| 5,778,197 | 7/1998 | Dunham | 395/284 |
| 5,781,703 | 7/1998 | Desai et al. | 395/54 |
| 5,781,744 | 7/1998 | Johnson et al. | 395/283 |
| 5,781,767 | 7/1998 | Inoue et al. . | |
| 5,781,798 | 7/1998 | Beatty et al. . | |
| 5,784,555 | 7/1998 | Stone | 395/200.5 |
| 5,784,576 | 7/1998 | Guthrie et al. . | |
| 5,787,019 | 7/1998 | Knight et al. | 364/550 |
| 5,787,459 | 7/1998 | Stallmo et al. | 711/112 |
| 5,787,491 | 7/1998 | Merkin et al. | 711/173 |
| 5,790,775 | 8/1998 | Marks et al. | 395/182.07 |
| 5,790,831 | 8/1998 | Lin et al. . | |
| 5,793,987 | 8/1998 | Quackenbush et al. . | |
| 5,794,035 | 8/1998 | Golub et al. . | |
| 5,796,185 | 8/1998 | Takata et al. . | |
| 5,796,580 | 8/1998 | Komatsu et al. | 361/687 |
| 5,796,981 | 8/1998 | Abudayyeh et al. . | |
| 5,797,023 | 8/1998 | Berman et al. | 395/750.06 |
| 5,798,828 | 8/1998 | Thomas et al. . | |

| | | | |
|---|---|---|---|
| 5,799,036 | 8/1998 | Staples . | |
| 5,799,196 | 8/1998 | Flannery | 395/750.03 |
| 5,801,921 | 9/1998 | Miller . | |
| 5,802,269 | 9/1998 | Poisner et al. . | |
| 5,802,298 | 9/1998 | Imai et al. | 395/200.47 |
| 5,802,305 | 9/1998 | McKaughan et al. | 395/200.57 |
| 5,802,324 | 9/1998 | Wunderlich et al. | 395/281 |
| 5,802,393 | 9/1998 | Begun et al. . | |
| 5,802,552 | 9/1998 | Fandrich et al. . | |
| 5,802,592 | 9/1998 | Chess et al. | 711/164 |
| 5,803,357 | 9/1998 | Lakin | 236/78 B |
| 5,805,834 | 9/1998 | McKinley et al. . | |
| 5,809,224 | 9/1998 | Schultz et al. . | |
| 5,809,287 | 9/1998 | Stupek, Jr. et al. | 395/500 |
| 5,809,311 | 9/1998 | Jones | 395/750.01 |
| 5,812,748 | 9/1998 | Ohran et al. | 395/182.02 |
| 5,812,750 | 9/1998 | Dev et al. | 395/182.02 |
| 5,812,757 | 9/1998 | Okamoto et al. . | |
| 5,812,858 | 9/1998 | Nookala et al. . | |
| 5,815,117 | 9/1998 | Kolanek . | |
| 5,815,647 | 9/1998 | Buckland et al. | 395/182.01 |
| 5,815,652 | 9/1998 | Ote et al. | 395/183.07 |
| 5,821,596 | 10/1998 | Miu et al. | 257/419 |
| 5,822,547 | 10/1998 | Boesch et al. . | |
| 5,835,719 | 11/1998 | Gibson et al. | 395/200.51 |
| 5,835,738 | 11/1998 | Blackledge, Jr. et al. . | |
| 5,838,932 | 11/1998 | Alzien | 395/308 |
| 5,841,991 | 11/1998 | Russell . | |
| 5,852,720 | 12/1998 | Gready et al. . | |
| 5,852,724 | 12/1998 | Glenn, II et al. | 395/200.69 |
| 5,857,074 | 1/1999 | Johnson . | |
| 5,857,102 | 1/1999 | McChesney et al. | 395/653 |
| 5,864,653 | 1/1999 | Tavallaei et al. | 315/181 |
| 5,867,730 | 2/1999 | Leyda | 395/803 |
| 5,875,307 | 2/1999 | Ma et al. | 395/281 |
| 5,875,310 | 2/1999 | Buckland et al. | 395/306 |
| 5,878,237 | 3/1999 | Olarig | 395/308 |
| 5,878,238 | 3/1999 | Gan et al. | 395/308 |
| 5,881,311 | 3/1999 | Woods | 395/824 |
| 5,884,027 | 3/1999 | Garbus et al. | 395/200.8 |
| 5,889,965 | 3/1999 | Wallach et al. | 395/283 |
| 5,892,928 | 4/1999 | Wallach et al. | 395/283 |
| 5,898,888 | 4/1999 | Guthrie et al. | 395/308 |
| 5,905,867 | 5/1999 | Giorgio | 395/200.54 |
| 5,907,672 | 5/1999 | Matze et al. | 395/182.06 |
| 5,913,034 | 6/1999 | Malcolm | 395/200.53 |
| 5,922,060 | 7/1999 | Goodrum | 710/103 |
| 5,936,960 | 8/1999 | Stewart | 370/438 |

OTHER PUBLICATIONS

Davis, T., Usenet post to alt.msdos.batch, Apr. 1997, "Re: Need help with automating FDISK and Format . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novell® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guide."

Sun Microsystems, Part No. 802–6569–11, Release 1.0.1, Nov. 1996, "Remote Systems Diagnostics Installation & User Guide."

NetFRAME Systems Incorporated, *News Release, 3 pages,* referring to May 9, 1994, "NetFRAME's New High–Availability ClusterServer Systems Avoid Scheduled as well as Unscheduled Downtime."

Herr, et al., Linear Technology Magazine, *Design Features,* pp. 21–23, Jun. 1997, "Hot Swapping the PCI Bus."

Lockareff, M., HTINews,, http://www.hometoys.com/htinews/dec96/articles/lonworks.htm, Dec. 1996, "Lonworks—An Introduction".

NetFRAME Systems Incorporated, *datasheet,* Feb. 1992, "NF450FT Network Mainframe".

NetFRAME Systems Incorporated, *datasheet,* Mar. 1996, "NetFRAME Cluster Server 8000".

Schofield, M.J., http://www.omegas.co.uk/CAN/canworks.htm, Copyright 1996, 1997, "Controller Area Network—How CAN Works".

http://www.nrtt.demon.co.uk/cantech.html, May 28, 1997, "CAN: Technical overview".

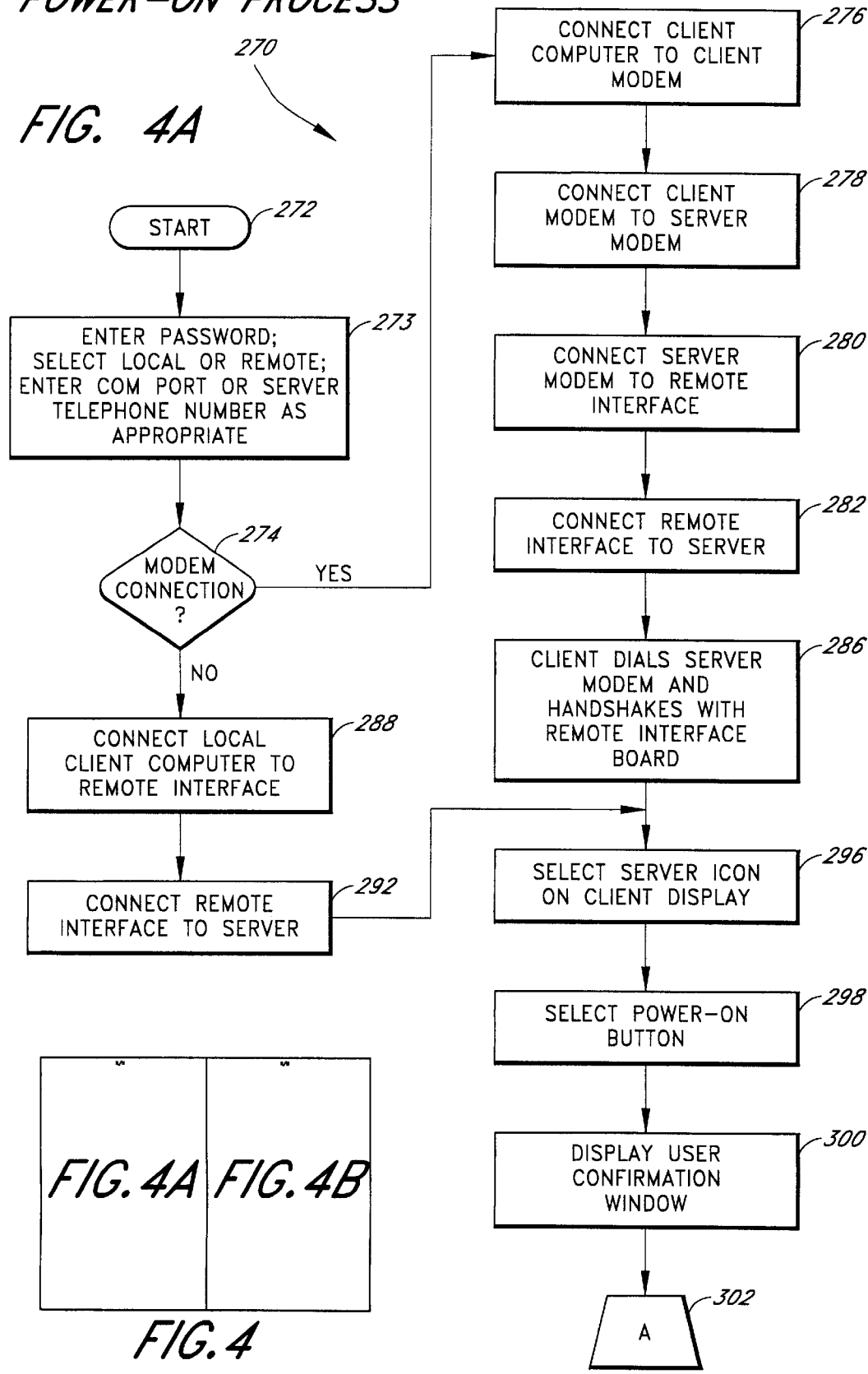

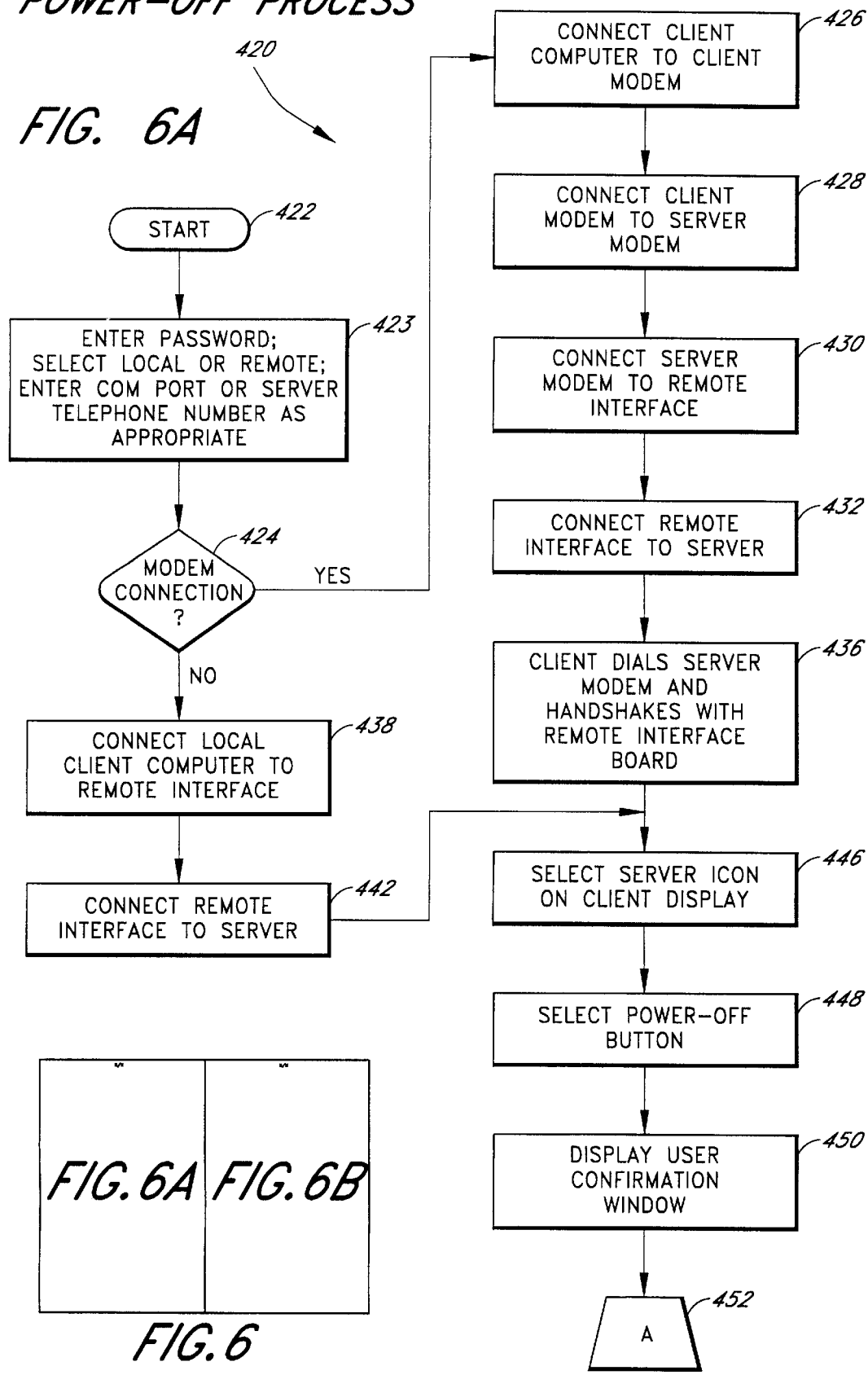
FIG. 6A — POWER-OFF PROCESS

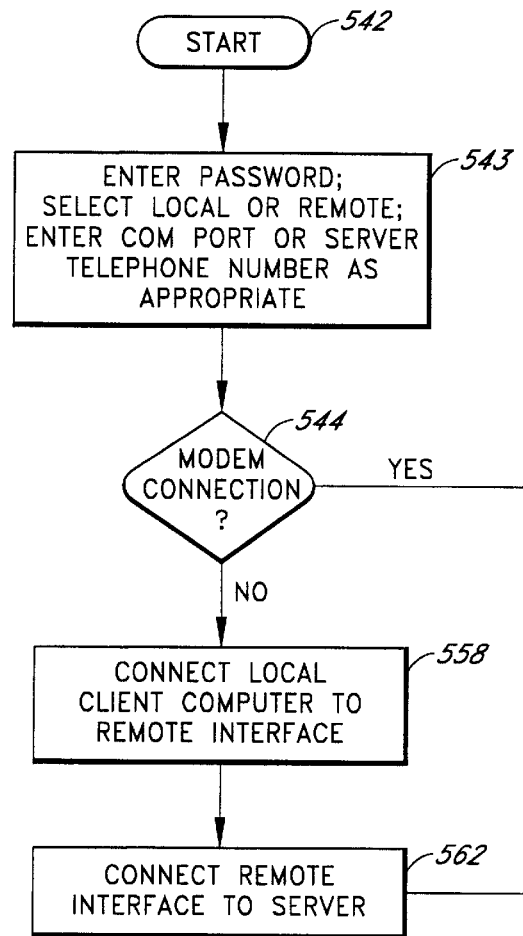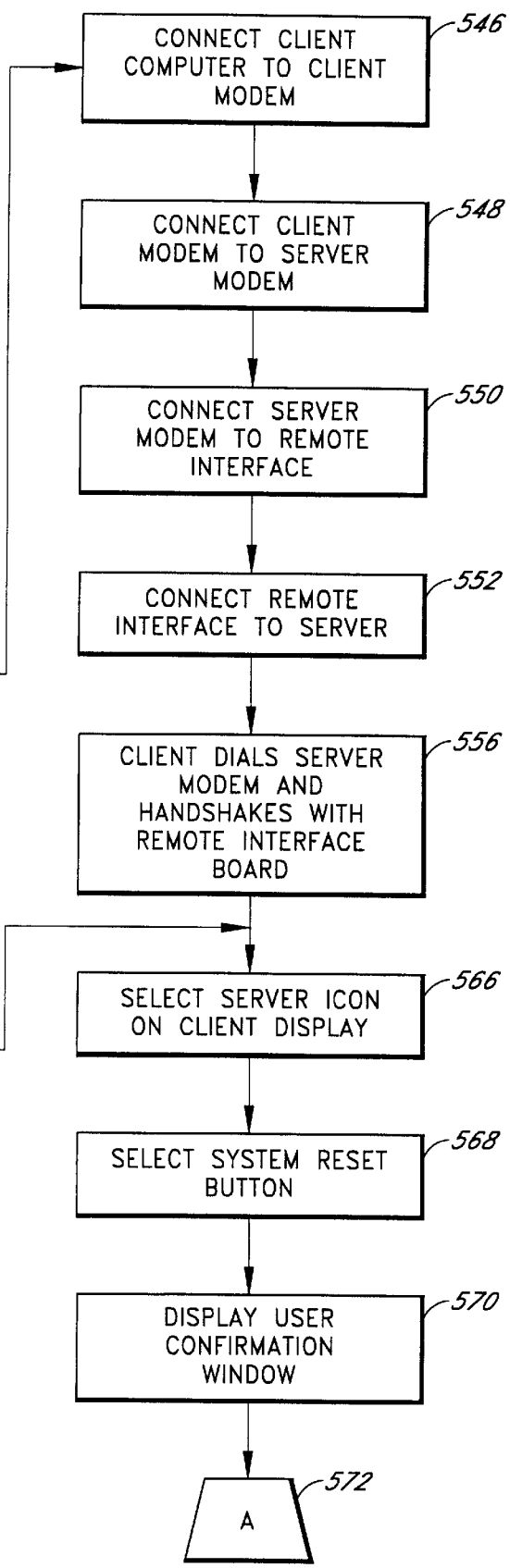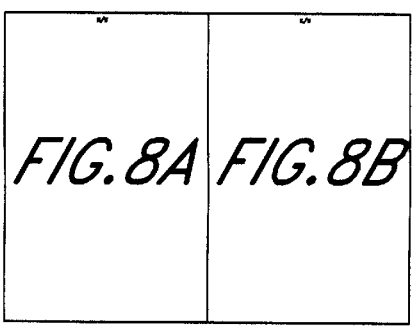

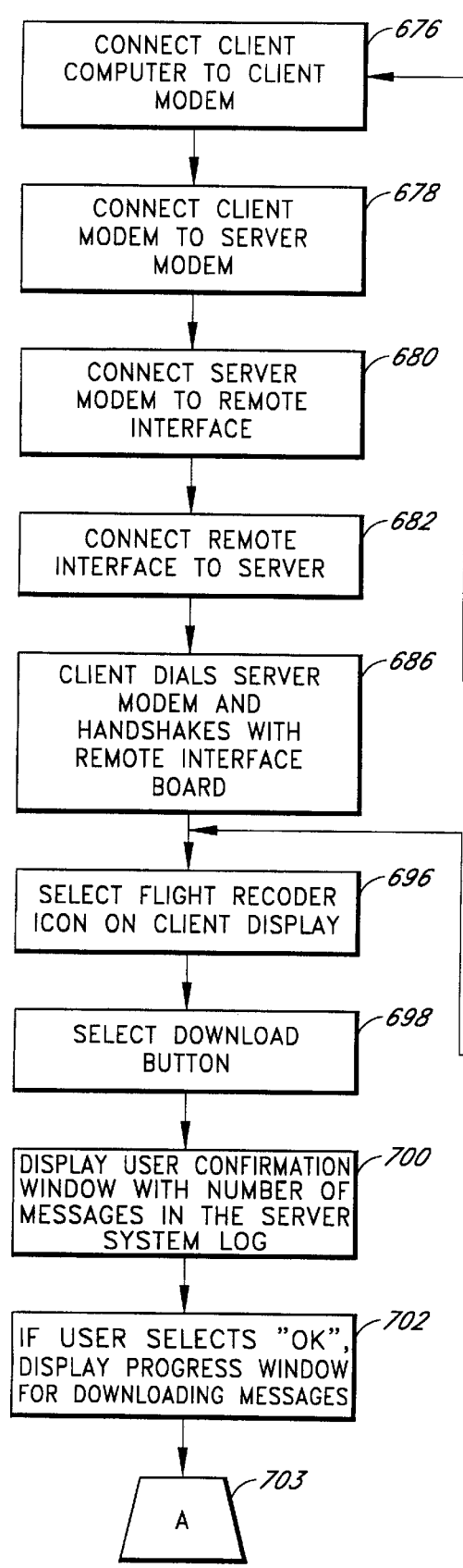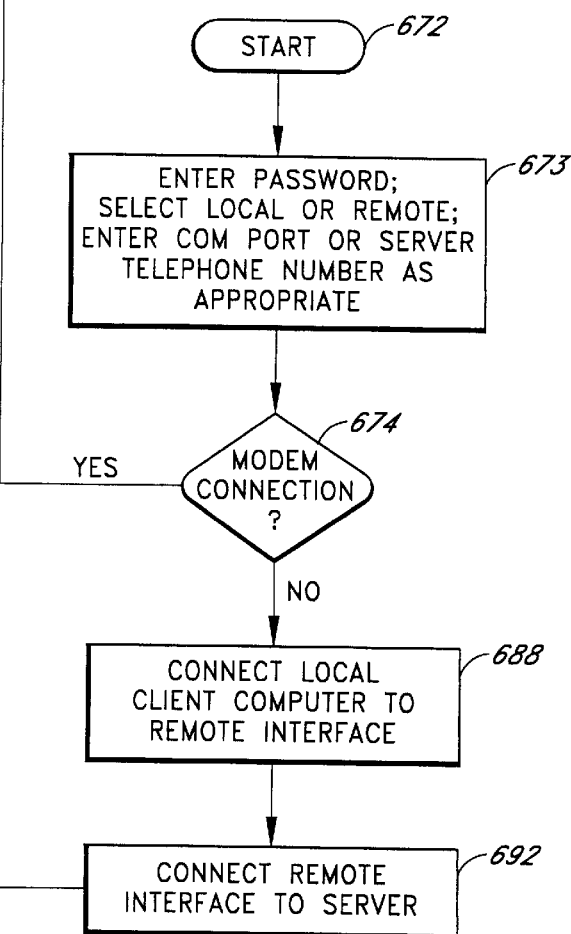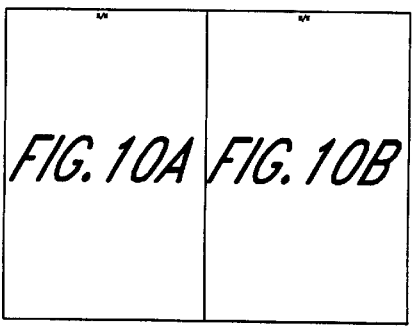

SYSTEM FOR READING SYSTEM LOG

RELATED APPLICATIONS

This application is related to U.S. application Ser. No. 08/943,076, entitled "SYSTEM FOR POWERING UP AND POWERING DOWN A SERVER", U.S. application Ser. No. 08/943,077, entitled "METHOD OF POWERING UP AND POWERING DOWN A SERVER", U.S. application Ser. No. 08/942,333, entitled "SYSTEM FOR RESETTING A SERVER", U.S. application Ser. No. 08/942,405, entitled "METHOD OF RESETTING A SERVER", U.S. application Ser. No. 08/942,068, entitled "METHOD OF DISPLAYING FLIGHT RECORDER", U.S. application Ser. No. 08/942,347, entitled "SYSTEM FOR DISPLAYING SYSTEM STATUS", U.S. application Ser. No. 08/942,071, entitled "METHOD OF DISPLAYING SYSTEM STATUS", which are being filed concurrently herewith on Oct. 1, 1997.

PRIORITY CLAIM

The benefit under 35 U.S.C. §119(e) of the following U.S. provisional application(s) is hereby claimed:

| Title | Application No. | Filing Date |
| --- | --- | --- |
| "Remote Software for Monitoring and Managing Environmental Management System" | 60/046,326 | May 13, 1997 |
| "Remote Access and Control of Environmental Management System" | 60/046,397 | May 13, 1997 |
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |

APPENDICIES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to fault tolerant computer systems. More specifically, the invention is directed to a system for providing remote access and control of server environmental management.

2. Description of the Related Technology

As enterprise-class servers become more powerful and more capable, they are also becoming increasingly sophisticated and complex. For many companies, these changes lead to concerns over server reliability and manageability, particularly in light of the increasingly critical role of server-based applications. While in the past many systems administrators were comfortable with all of the various components that made up a standards-based network server, today's generation of servers can appear as an incomprehensible, unmanageable black box. Without visibility into the underlying behavior of the system, the administrator must "fly blind." Too often the only indicators the network manager has on the relative health of a particular server is whether or not it is running.

It is well-acknowledged that there is a lack of reliability and availability of most standards-based servers. Server downtime, resulting either from hardware or software faults or from regular maintenance, continues to be a significant problem. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging Internet, intranet and collaborative applications taking on more essential business roles every day, the cost of network server downtime will continue to spiral upward.

While hardware fault tolerance is an important element of an overall high availability architecture, it is only one piece of the puzzle. Studies show that a significant percentage of network server downtime is caused by transient faults in the I/O subsystem. These faults may be due, for example, to the device driver, the adapter card firmware, or hardware which does not properly handle concurrent errors, and often causes servers to crash or hang. The result is hours of downtime per failure, while a system administrator discovers the failure takes some action, and manually reboots the server. In many cases, data volumes on hard disk drives become corrupt and must be repaired when the volume is mounted. A dismount-and-mount cycle may result from the lack of "hot pluggability" in current standards-based servers. Diagnosing intermittent errors can be a frustrating and time-consuming process. For a system to deliver consistently high availability, it must be resilient to these types of faults. Accurate and available information about such faults is central to diagnosing the underlying problems and taking corrective action.

Modern fault tolerant systems have the functionality to provide the ambient temperature of a storage device enclosure and the operational status of other components such as the cooling fans and power supply. However, a limitation of these server systems is that they do not contain self-managing processes to correct malfunctions. Also, if a malfunction occurs in a typical server, it relies on the operating system software to report, record and manage recovery of the fault. However, many types of faults will prevent such software from carrying out these tasks. For example, a disk drive failure can prevent recording of the fault in a log file on that disk drive. If the system error caused the system to power down, then the system administrator would never know the source of the error.

Traditional systems are lacking in detail and sophistication when notifying system administrators of system malfunctions. System administrators are in need of a graphical user interface for monitoring the health of a network of servers. Administrators need a simple point-and-click interface to evaluate the health of each server in the network. In addition, existing fault tolerant servers rely upon operating system maintained logs for error recording. These systems are not capable of maintaining information when the operating system is inoperable due to a system malfunction. Existing systems do not have a system log for maintaining information when the main computational processors are inoperable or the operating system has crashed.

Another limitation of the typical fault tolerant system is that the control logic for the diagnostic system is associated with a particular processor. Thus, if the environmental control processor malfunctioned, then all diagnostic activity on the computer would cease. In traditional systems, if a controller dedicated to the fan system failed, then all fan activity could cease resulting in overheating and ultimate failure of the server. What is desired is a way to obtain diagnostic information when the server OS is not operational or even when main power to the server is down.

Existing fault tolerant systems also lack the power to remotely control a particular server, such as powering up and down, resetting, retrieving or updating system status, displaying flight recorder information and so forth Such control of the server is desired even when the server power is down. For example, if the operating system on the remote machine failed, then a system administrator would have to physically go to the remote machine to re-boot the malfunctioning machine before any system information could be obtained or diagnostics could be started.

Therefore, a need exists for improvements in server management which will result in greater reliability and dependability of operation. Server users are in need of a management system by which the users can accurately gauge the health of their system. Users need a high availability system that must not only be resilient to faults, but must allow for maintenance, modification, and growth—without downtime. System users must be able to replace failed components, and add new functionality, such as new network interfaces, disk interface cards and storage, without impacting existing users. As system demands grow, organizations must frequently expand, or scale, their computing infrastructure, adding new processing power, memory, storage and I/O capacity. With demand for 24-hour access to critical, server-based information resources, planned system downtime for system service or expansion has become unacceptable.

SUMMARY OF THE INVENTION

The inventive remote access system provides system administrators with new levels of client/server system availability and management. It gives system administrators and network managers a comprehensive view into the underlying health of the server—in real time, whether on-site or off-site. In the event of a failure, the invention enables the administrator to learn why the system failed, why the system was unable to boot, and to control certain functions of the server from a remote station.

One embodiment of the present invention is a system for reading a system log for a computer, the system comprising: a first computer; a microcontroller capable of providing to the first computer a read system log signal; a remote interface connected to the microcontroller; and a second computer connected to the first computer via the remote interface and communicating a read system log command to the microcontroller.

Another embodiment of the present invention is a system for reading a system log on a computer, the system comprising a log memory; a microcontroller connected to the log memory; a first computer storing event information in the log memory; a remote interface connected to the microcontroller; and a second computer connected to the first computer via the remote interface and communicating a read system log command to the microcontroller.

BRIEF DESCRIPTION OF THE DRAWINGS

FIGS. 4a and 4b are one embodiment of a flow diagram of a power-on process performed by the microcontroller network and client computer of FIGS. 1 and 2.

FIGS. 6a and 6b are one embodiment of a flow diagram of a power-off process performed by the microcontroller network and client computer of FIGS. 1 and 2.

FIGS. 8a and 8b are one embodiment of a flow diagram of a reset process performed by the microcontroller network and client computer of FIGS. 1 and 2.

FIGS. 10a and 10b are one embodiment of a flow diagram of a display flight recorder process performed by the microcontroller network and client computer of FIGS. 1 and 2.

DETAILED DESCRIPTION OF THE INVENTION

Figure 1:
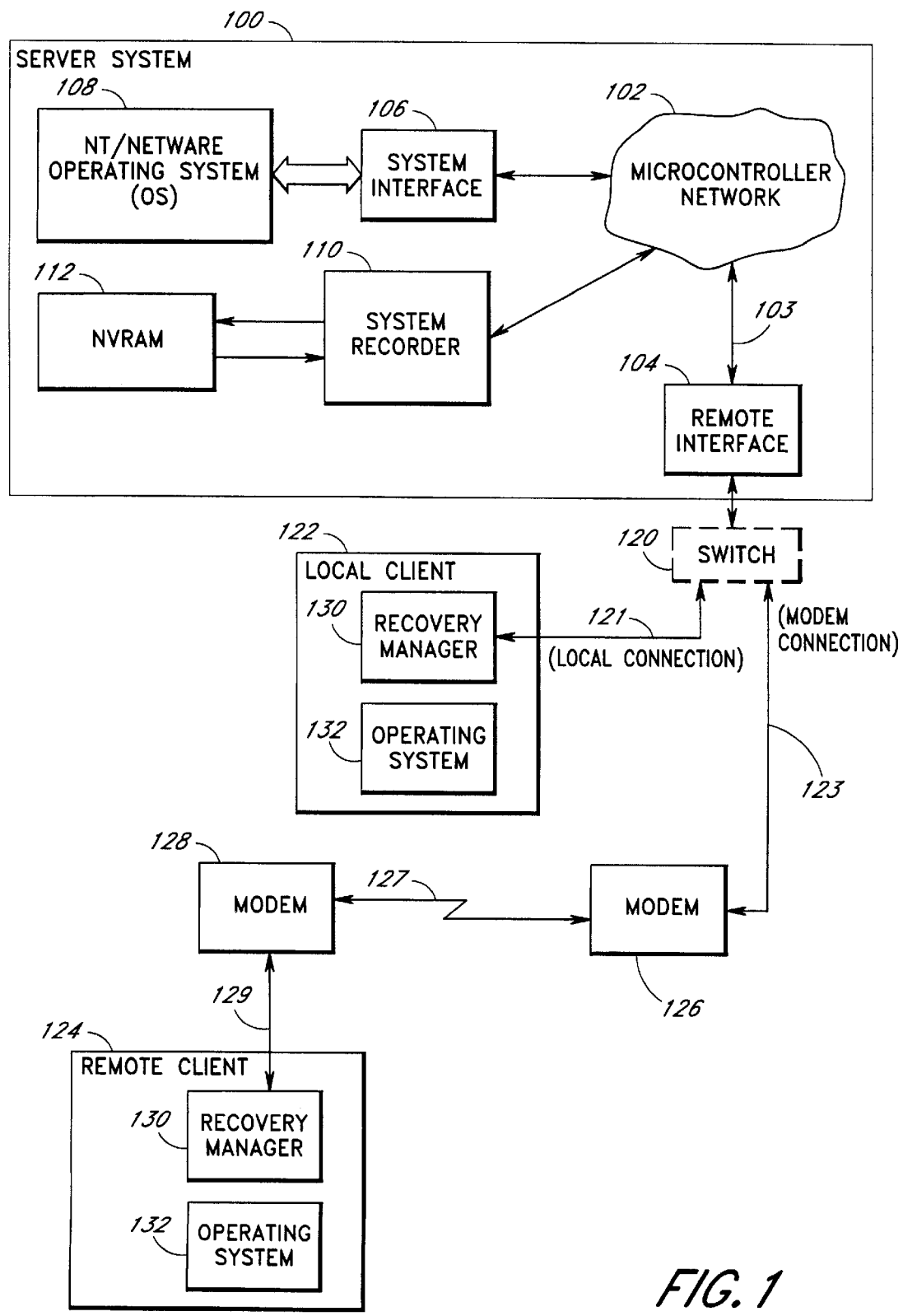
FIG. 1 is a top level block diagram of a server system having a microcontroller network in communication with a local client computer or a remote client computer utilized by one embodiment of the present invention.

The following detailed description presents a description of certain specific embodiments of the present invention.

However, the present invention can be embodied in a multitude of different ways as defined and covered by the claims. In this description, reference is made to the drawings wherein like parts are designated with like numerals throughout.

For convenience, the description will be organized into the following principal sections: Introduction, Server System, Microcontroller Network, Remote Interface Serial Protocol, Power-On Flow, Power-Off Flow, Reset Flow, Flight Recorder Flow, and System Status Flow.

I. INTRODUCTION

The inventive computer server system and client computer includes a distributed hardware environment management system that is built as a small self-contained network of microcontrollers. Operating independently of the system processor and operating software, the present invention uses one or more separate processors for providing information and managing the hardware environment that may include fans, power supplies and/or temperature.

One embodiment of the present invention facilitates remotely powering-on and powering-off of the server system by use of a client computer. The client computer may be local to the server system, or may be at a location remote from the server system, in which case a pair of modems are utilized to provide communication between the client computer and the server system. A remote interface board connects to the server and interfaces to the server modem. Recovery manager software is loaded on the client computer to control the power-on and power-off processes and to provide feedback to a user though a graphical user interface.

Another embodiment of the present invention facilitates remotely resetting the server system by use of the client computer. Resetting the server system brings the server and operating system to a normal operating state. Recovery manager software is loaded on the client computer to control the resetting process and to provide feedback to a user though a graphical user interface.

Another embodiment of the present invention provides for a system log, known as a "flight recorder," which records hardware component failure and software crashes in a Non-Volatile RAM. With real time and date referencing, the system recorder enables system administrators to re-construct system activity by accessing the log. This information is very helpful in diagnosing the server system.

Initialization, modification and retrieval of system conditions is performed through utilization of a remote interface by issuing commands to the environmental processors. The system conditions may include system log size, presence of faults in the system log, serial number for each of the environmental processors, serial numbers for each power supply of the system, system identification, system log count, power settings and presence, canister presence, temperature, BUS/CORE speed ratio, fan speeds, setting for fan faults, LCD display, Non-Maskable Interrupt (NMI) request bits, CPU fault summary, FRU status, JTAG enable bit, system log information, remote access password, over-temperature fault, CPU error bits, CPU presence, CPU thermal fault bits, and remote port modem. The aforementioned list of capabilities provided by the present environmental system is not all-inclusive.

The server system and client computer provides mechanisms for the evaluation of the data that the system collects and methods for the diagnosis and repair of server problems in a manner that system errors can be effectively and efficiently managed. The time to evaluate and repair problems is minimized. The server system ensures that the system will not go down, so long as sufficient system resources are available to continue operation, but rather degrade gracefully until the faulty components can be replaced.

II. SERVER SYSTEM

Referring to FIG. 1, a server system 100 with a client computer will be described. In one embodiment, the server system hardware environment 100 may be built around a self-contained network of microcontrollers, such as, for example, a remote interface microcontroller on the remote interface board or circuit 104, a system interface microcontroller 106 and a system recorder microcontroller 110. This distributed service processor network 102 may operate as a fully self-contained subsystem within the server system 100, continuously monitoring and managing the physical environment of the machine (e.g., temperature, voltages, fan status). The microcontroller network 102 continues to operate and provides a system administrator with critical system information, regardless of the operational status of the server 100.

Information collected and analyzed by the microcontroller network 102 can be presented to a system administrator using either SNMP-based system management software (not shown), or using microcontroller network Recovery Manager software 130 through a local connection 121 or a dial-in connection 123. The system management software, which interfaces with the operating software (OS) 108 such as Microsoft Windows NT Version 4.0 or Novell Netware Version 4.11, for example, provides the ability to manage the specific characteristics of the server system, including Hot Peripheral Component Interconnect (PCI), power and cooling status, as well as the ability to handle alerts associated with these features when the server is operational.

The microcontroller network Recovery Manager software 130 allows the system administrator to query the status of the server system 100 through the microcontroller network 102, even when the server is down. In addition, the server Operating Software 108 does not need to be running to utilize the Recovery Manager 130. Users of the Recovery Manager 130 are able to manage, diagnose and restore service to the server system quickly in the event of a failure through a friendly graphical user interface (GUI).

Using the microcontroller network remote management capability, a system administrator can use the Recovery Manager 130 to re-start a failed system through a modem connection 123. First, the administrator can remotely view the microcontroller network Flight Recorder, a feature that may, in one embodiment, store all system messages, status and error reports in a circular System Recorder memory. In one embodiment, the System Recorder memory may be a Non-Volatile Random Access Memory buffer (NVRAM) 112. Then, after determining the cause of the system problem, the administrator can use microcontroller network "fly by wire" capability to reset the system, as well as to power the system off or on. "Fly by wire" denotes that no switch, indicator or other control is directly connected to the function it monitors or controls, but instead, all the control and monitoring connections are made by the microcontroller network 102.

The remote interface or remote interface board (RIB) 104 interfaces the server system 100 to an external client computer. The RIB 104 connects to either a local client computer 122 at the same location as the server 100 or to a remote client computer 124 either directly or through an optional switch 120. The client computer 122/124 may in one embodiment run either Microsoft Windows 95 or Windows NT Workstation version 4.0 operating software (OS) 132. The processor and RAM requirements of the client computer 122/124 are such as may be specified by the vendor of the OS 132. The serial port of the client computer 122/124 may utilize a type 16550A Universal Asynchronous Receiver Transmitter (UART). The switch facilitates either the local connection 121 or the modem connection 123 at any one time, but allows both types of connections to be connected to the switch. In an another embodiment, either the local connection 121 or the modem connection 123 is connected directly to the RIB 104. The local connection 121 utilizes a readily available null-modem serial cable to connect to the local client computer. The modem connection may utilize a Hayes-compatible server modem 126 and a Hayes-compatible client modem 128. In one embodiment, a model fax modem V.34 X 33.6 K available from Zoom is utilized as the client modem and the server modem. In another embodiment, a Sportster 33.6 K fax modem available from US Robotics is utilized as the client modem.

The steps of connecting the remote client computer 124 to the server 100 will now be briefly described. The remote interface 104 has a serial port connector (not shown) that directly connects with a counterpart serial port connector of the external server modem 126 without the use of a cable. If desired, a serial cable could be used to interconnect the remote interface 104 and the server modem 126. The cable end of an AC to DC power adapter (not shown, for example 120 Volt AC/7.5 Volt DC) is then connected to a DC power connector (not shown) of the remote interface, while the double-prong end is plugged into a 120 Volt AC wall outlet. One end of an RJ-45 parallel-wire data cable 103 is then plugged into an RJ-45 jack (not shown) on the remote interface 104, while the other end is plugged into a RJ-45 Recovery Manager jack on the server 100. The RJ-45 jack on the server then connects to the microcontroller network 102. The server modem 126 is then connected to a communications network 127 using an appropriate connector. The communications network 127 may be a public switched telephone network, although other modem types and communication networks are envisioned. For example, if cable modems are used for the server modem 126 and client modem 128, the communications network can be a cable television network. As another example, satellite modulator/demodulators can be used in conjunction with a satellite network.

In another embodiment, the server modem to client modem connection may be implemented by an Internet connection utilizing the well known TCP/IP protocol. Any of several Internet access devices, such as modems or network interface cards, may be utilized. Thus, the communications network 127 may utilize either circuit or packet switching.

At the remote client computer 124, a serial cable (for example, a 25-pin D-shell) 129 is used to interconnect the client modem 128 and the client computer 124. The client modem 128 is then connected to the communications network 127 using an appropriate connector. Each modem is then plugged into an appropriate power source for the modem, such as an AC outlet. At this time, the Recovery Manager software 130 is loaded into the client computer 124, if not already present, and activated.

The steps of connecting the local client computer 122 to the server 100 are similar, but modems are not necessary. The main difference is that the serial port connector of the remote interface 104 connects to a serial port of the local client computer 122 by the null-modem serial cable 121.

III. MICROCONTROLLER NETWORK

In one embodiment, the current invention may include a network of microcontrollers 102 (FIG. 1). The microcontrollers may provide functionality for system control, diagnostic routines, self-maintenance control, and event logging processors. A further description of the microcontrollers and microcontroller network is provided in U.S. patent application Ser. No. 08/942,402, entitled "Diagnostic and Managing Distributed Processor System".

Figure 2:
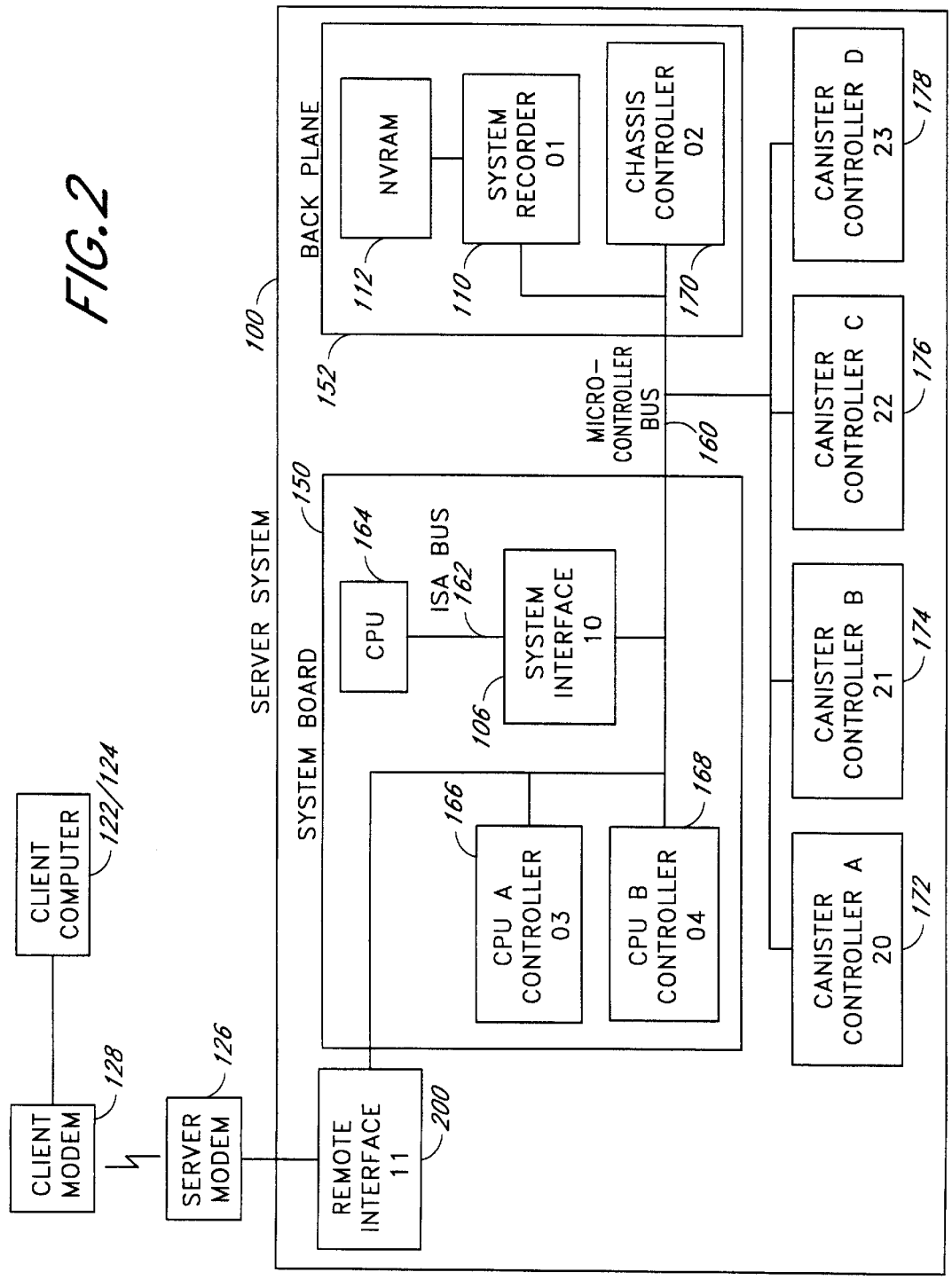
FIG. 2 is a detailed block diagram of the microcontroller network shown in FIG. 1.

Referring to FIG. 2, in one embodiment of the invention, the network of microcontrollers 102 includes ten processors. One of the purposes of the microcontroller network 102 is to transfer messages to the other components of the server system 100. The may processors include: a System Interface controller 106, a CPU A controller 166, a CPU B controller 168, a System Recorder 110, a Chassis controller 170, a Canister A controller 172, a Canister B controller 174, a Canister C controller 176, a Canister D controller 178 and a Remote Interface controller 200. The Remote Interface controller 200 is located on the RIB 104 (FIG. 1) which is part of the server system 100, but may be external to a server enclosure. The System Interface controller 106, the CPU A controller 166 and the CPU B controller 168 are located on a system board 150 (also sometimes called a motherboard) in the server 100. Also located on the system board are one or more central processing units (CPUs) or microprocessors 164 and an Industry Standard Architecture (ISA) bus 162 that connects to the System Interface Controller 106. Of course, other buses such as PCI, EISA and Microchannel may be used. The CPU 164 may be any conventional general purpose single-chip or multi-chip microprocessor such as a Pentium®, Pentium® Pro or Pentium® II processor available from Intel Corporation, a SPARC processor available from Sun Microsystems, a MIPS® processor available from Silicon Graphics, Inc., a Power PC® processor available from Motorola, or an ALPHA® processor available from Digital Equipment Corporation. In addition, the CPU 164 may be any conventional special purpose microprocessor such as a digital signal processor or a graphics processor.

The System Recorder 110 and Chassis controller 170, along with the System Recorder memory 112 that connects to the System Recorder 110, may be located on a backplane 152 of the server 100. The System Recorder 110 and Chassis controller 170 are the first microcontrollers to power up when server power is applied. The System Recorder 110, the Chassis controller 170 and the Remote Interface microcontroller 200 (on the RIB) are the three microcontrollers that have a bias 5 Volt power supplied to them. If main server power is off, an independent power supply source for the bias 5 Volt power is provided by the RIB 104 (FIG. 1). The Canister controllers 172–178 are not considered to be part of the backplane 152 because they are located on separate cards which are removable from the backplane 152.

Each of the microcontrollers has a unique system identifier or address. The addresses are as follows in Table 1:

TABLE 1

| Microcontroller | Address |
| --- | --- |
| System Interface controller 106 | 10 |
| CPU A controller 166 | 03 |
| CPU B controller 168 | 04 |
| System Recorder 110 | 01 |
| Chasis controller 170 | 02 |
| Canister A controller 172 | 20 |

TABLE 1-continued

| Microcontroller | Address |
|---|---|
| Canister B controller 174 | 21 |
| Canister C controller 176 | 22 |
| Canister D controller 178 | 23 |
| Remote Interface controller 200 | 11 |

The microcontrollers may be Microchip Technologies, Inc. PIC processors in one embodiment, although other microcontrollers, such as an 8051 available from Intel, an 8751, available from Atmel, or a P80CL580 microprocessor available from Philips Semiconductor, could be utilized. The PIC16C74 (Chassis controller 170) and PIC16C65 (the other controllers) are members of the PIC16CXX family of high-performance CMOS, fully-static, EPROM-based 8-bit microcontrollers. The PIC controllers have 192 bytes of RAM, in addition to program memory, three timer/counters, two capture/compare/Pulse Width Modulation modules and two serial ports. The synchronous serial port is configured as a two-wire Inter-Integrated Circuit ($I^2C$) bus in one embodiment of the invention. The PIC controllers use a Harvard architecture in which program and data are accessed from separate memories. This improves bandwidth over traditional von Neumann architecture controllers where program and data are fetched from the same memory. Separating program and data memory further allows instructions to be sized differently than the 8-bit wide data word. Instruction opcodes are 14-bit wide making it possible to have all single word instructions. A 14-bit wide program memory access bus fetches a 14-bit instruction in a single cycle.

In one embodiment of the invention, the microcontrollers communicate through an $I^2C$ serial bus, also referred to as a microcontroller bus 160. The document "The $I^2C$ Bus and How to Use It" (Philips Semiconductor, 1992) is hereby incorporated by reference. The $I^2C$ bus is a bidirectional two-wire bus and operates at a 400 kbps rate in the present embodiment. However, other bus structures and protocols could be employed in connection with this invention. For example, the Apple Computer ADB, Universal Serial Bus, IEEE-1394 (Firewire), IEEE-488 (GPIB), RS-485, or Controller Area Network (CAN) could be utilized as the microcontroller bus. Control on the microcontroller bus is distributed. Each microcontroller can be a sender (a master) or a receiver (a slave) and each is interconnected by this bus. A microcontroller directly controls its own resources, and indirectly controls resources of other microcontrollers on the bus.

Here are some of the features of the $I^2C$-bus:

Two bus lines are utilized: a serial data line (SDA) and a serial clock line (SCL).

Each device connected to the bus is software addressable by a unique address and simple master/slave relationships exist at all times; masters can operate as master-transmitters or as master-receivers.

The bus is a true multi-master bus including collision detection and arbitration to prevent data corruption if two or more masters simultaneously initiate data transfer.

Serial, 8-bit oriented, bidirectional data transfers can be made at up to 400 kbit/second in the fast mode.

Two wires, serial data (SDA) and serial clock (SCL), carry information between the devices connected to the $I^2C$ bus. Each device is recognized by a unique address and can operate as either a transmitter or receiver, depending on the function of the device. For example, a memory device connected to the $I^2C$ bus could both receive and transmit data. In addition to transmitters and receivers, devices can also be considered as masters or slaves when performing data transfers (see Table 2). A master is the device which initiates a data transfer on the bus and generates the clock signals to permit that transfer. At that time, any device addressed is considered a slave.

TABLE 2

Definition of $I^2C$-bus terminology

| Term | Description |
|---|---|
| Transmitter | The device which sends the data to the bus |
| Receiver | The device which receives the data from the bus |
| Master | The device which initiates a transfer, generates clock signals and terminates a transfer |
| Slave | The device addressed by a master |
| Multi-master | More than one master can attempt to control the bus at the same time without corrupting the message |
| Arbitration | Procedure to ensure that, if more than one master simultaneously tries to control the bus, only one is allowed to do so and the message is not corrupted |
| Synchronization | Procedure to synchronize the clock signal of two or more devices |

The $I^2C$-bus is a multi-master bus. This means that more than one device capable of controlling the bus can be connected to it. As masters are usually microcontrollers, consider the case of a data transfer between two microcontrollers connected to the $I^2C$-bus. This highlights the master-slave and receiver-transmitter relationships to be found on the $I^2C$-bus. It should be noted that these relationships are not permanent, but depend on the direction of data transfer at that time. The transfer of data would proceed as follows:

1) Suppose microcontroller A wants to send information to microcontroller B:
   microcontroller A (master), addresses microcontroller B (slave);
   microcontroller A (master-transmitter), sends data to microcontroller B (slave-receiver);
   microcontroller A terminates the transfer.

2) If microcontroller A wants to receive information from microcontroller B:
   microcontroller A (master) addresses microcontroller B (slave);
   microcontroller A (master-receiver) receives data from microcontroller B (slave-transmitter);
   microcontroller A terminates the transfer.

Even in this situation, the master (microcontroller A) generates the timing and terminates the transfer.

The possibility of connecting more than one microcontroller to the $I^2C$-bus means that more than one master could try to initiate a data transfer at the same time. To avoid the chaos that might ensue from such an event, an arbitration procedure has been developed. This procedure relies on the wired-AND connection of all $I^2C$ interfaces to the $I^2C$-bus.

If two or more masters try to put information onto the bus, the first to produce a 'one' when the other produces a 'zero' will lose the arbitration. The clock signals during arbitration are a synchronized combination of the clocks generated by the masters using the wired-AND connection to the SCL line.

Generation of clock signal on the $I^2C$-bus is the responsibility of master devices. Each master microcontroller generates its own clock signals when transferring data on the bus.

The command, diagnostic, monitoring and history functions of the microcontroller network 102 are accessed using a global network memory model in one embodiment. That is, any function may be queried simply by generating a network "read" request targeted at the function's known global network address. In the same fashion, a function may be exercised simply by "writing" to its global network address. Any microcontroller may initiate read/write activity by sending a message on the I²C bus to the microcontroller responsible for the function (which can be determined from the known global address of the function). The network memory model includes typing information as part of the memory addressing information.

Using a network global memory model in one embodiment places relatively modest requirements for the I²C message protocol.

All messages conform to the I²C message format including addressing and read/write indication.

All I²C messages use seven bit addressing.

Any controller can originate (be a Master) or respond (be a Slave).

All message transactions consist of I²C "Combined format" messages. This is made up of two back-to-back I²C simple messages with a repeated START condition between (which does not allow for re-arbitrating the bus). The first message is a Write (Master to Slave) and the second message is a Read (Slave to Master).

Two types of transactions are used: Memory-Read and Memory-Write.

Sub-Addressing formats vary depending on data type being used.

IV. REMOTE INTERFACE SERIAL PROTOCOL

The microcontroller network remote interface serial protocol communicates microcontroller network messages across a point-to-point serial link. This link is between the RIB controller 200 that is in communication with the Recovery Manager 130 at the remote client 122/124. This protocol encapsulates microcontroller network messages in a transmission packet to provide error-free communication and link security.

In one embodiment, the remote interface serial protocol uses the concept of byte stuffing. This means that certain byte values in the data stream have a particular meaning. If that byte value is transmitted by the underlying application as data, it must be transmitted as a two-byte sequence.

The bytes that have a special meaning in this protocol are:

| | |
|---|---|
| SOM 206 | Start of a message |
| EOM 216 | End of a message |
| SUB | The next byte in the data stream must be substituted before processing. |
| INT 220 | Event Interrupt |
| Data 212 | An entire microcontroller network message |

As stated above, if any of these byte values occur as data in a message, a two-byte sequence must be substituted for that byte. The sequence is a byte with the value of SUB, followed by a type with the value of the original byte, which is incremented by one. For example, if a SUB byte occurs in a message, it is transmitted as a SUB followed by a byte that has a value of SUB+1.

Figure 3:
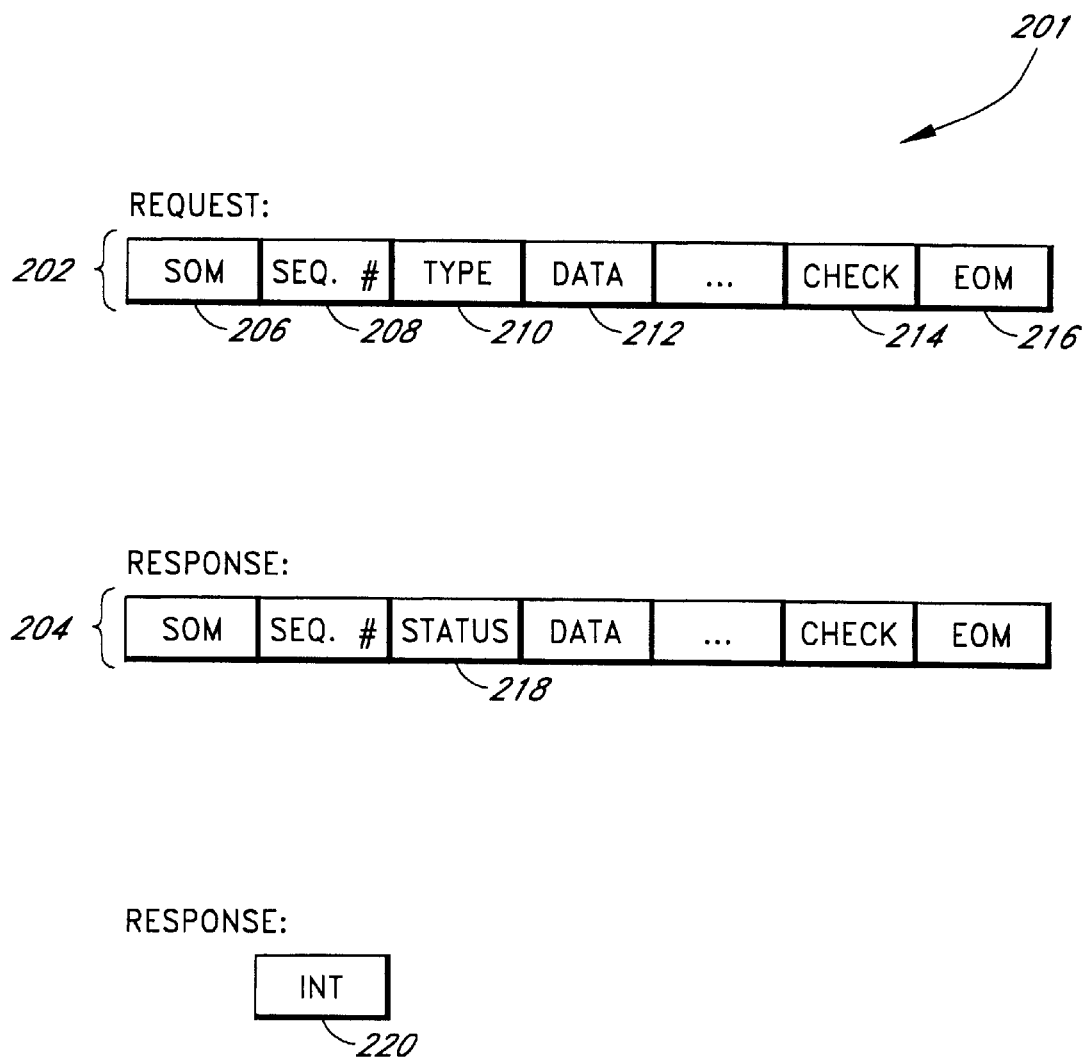
FIG. 3 is a diagram of serial protocol message formats utilized in communications between the client computer and remote interface shown in FIGS. 1 and 2.

Referring to FIG. 3 the two types of messages 201 used by the remote interface serial protocol will be described.

1. Requests 202, which are sent by remote management (client) computers 122/124 (FIG. 1) to the remote interface 104.

2. Responses 204, which are returned to the requester 122/124 by the remote interface 104.

The fields of the messages are defined as follows:

| | |
|---|---|
| SOM 206 | A special data byte value marking the start of a message. |
| EOM 216 | A special data byte value marking the end of a message. |
| Seq. #208 | A one-byte sequence number, which is incremented on each request. It is stored in the response. |
| TYPE 210 | One of the following types of requests: |
| IDENTIFY | Requests the remote interface to send back identification information about the system to which it is connected. It also resets the next expected sequence number. Security authorization does not need to be established before the request is issued. |
| SECURE | Establishes secure authorization on the serial link by checking password security data provided in the message with the microcontroller network password. |
| UNSECURE | Clears security authorization on the link and attempts to disconnect it. This requires security authorization to have been previously established. |
| MESSAGE | Passes the data portions of the message to the microcontroller network for execution. The response from the microcontroller network is sent back in the data portion of the response. This requires security authorization to have been previously established. |
| POLL | Queries the status of the remote interface. This request is generally used to determine if an event is pending in the remote interface. |
| STATUS 218 | One of the following response status values: |
| OK | Everything relating to communication with the remote interface is successful. |
| OK_EVENT | Everything relating to communication with the remote interface is successful. In addition, there is one or more events pending in the remote interface. |
| SEQUENCE | The sequence number of the request is neither the current sequence number or retransmission request, nor the next expected sequence number or new request. Sequence numbers may be reset by an IDENTIFY request. |
| CHECK | The check byte in the request message is received incorrectly. |
| FORMAT | Something about the format of the message is incorrect. Most likely, the type field contains an invalid value. |
| SECURE | The message requires that security authorization be in effect, or, if the message has a TYPE value of SECURE, the security check failed. |
| Check 214 | Indicates a message integrity check byte. Currently the value is 256 minus the sum of previous bytes in the message. For example, adding all bytes in the message up to and including the check byte should produce a result of zero (0). |
| INT 220 | A special one-byte message sent by the remote interface when it detects the transition from no events pending to one or more events pending. This message can be used to trigger reading events from the remote interface. Events should be read until the return status changes form OK_EVENT to OK. |

V. POWER-ON FLOW

The microcontroller network 102 (FIG. 1) performs various system administration tasks, such as, for example, monitoring the signals that come from server control switches, temperature sensors and client computers. By such signals, the microcontroller network 102, for example, turns on or turns off power to the server components, resets the server system, turns the system cooling fans to high, low or off, provides system operating parameters to the Basic Input/Output System (BIOS), transfers power-on self test (POST) events information from the BIOS, and/or sends data to a system display panel and remote computers.

Microcontroller Communication

A microcontroller, such as the remote interface microcontroller 200, handles two primary tasks: Sending and Receiving messages.

1. Handling the requests from other microcontrollers:
   Incoming messages are handled based on interrupt, where a first byte of an incoming message is the Slave Address which is checked by all controllers connected to the microcontroller bus 160 (FIG. 2). Whichever microcontroller has the matched ID would respond with an acknowledgement to the sender controller. The sender then sends one byte of the message type followed by a two byte command ID, low byte first. The next byte of the message defines the length of the data associated with the message. The first byte of the message also specifies whether it is a WRITE or READ command. If it is a WRITE command, the slave controller executes the command with the data provided in the message and sends back a status response at the end of the task. If it is a READ command, the slave controller gathers the requested information and sends it back as the response. The codes to execute request commands are classified in groups according to the data type to simplify the code.
2. Sending a message to other microcontrollers:
   Messages can be initiated by any controller on the bus 160 (FIG. 2). For example, the message can be an event detected by a controller and sent to the System Recorder controller and System Interface controller 106, or it could also be a message from the remote interface 104 (FIG. 1) to a specific controller on the bus 160. The sender usually sends the first byte defining the target processor and waits for the acknowledgement, which is the reverse logic from the Receiving a Message sequence. The sender also generates the necessary clock for the communication.

Figure 4B:
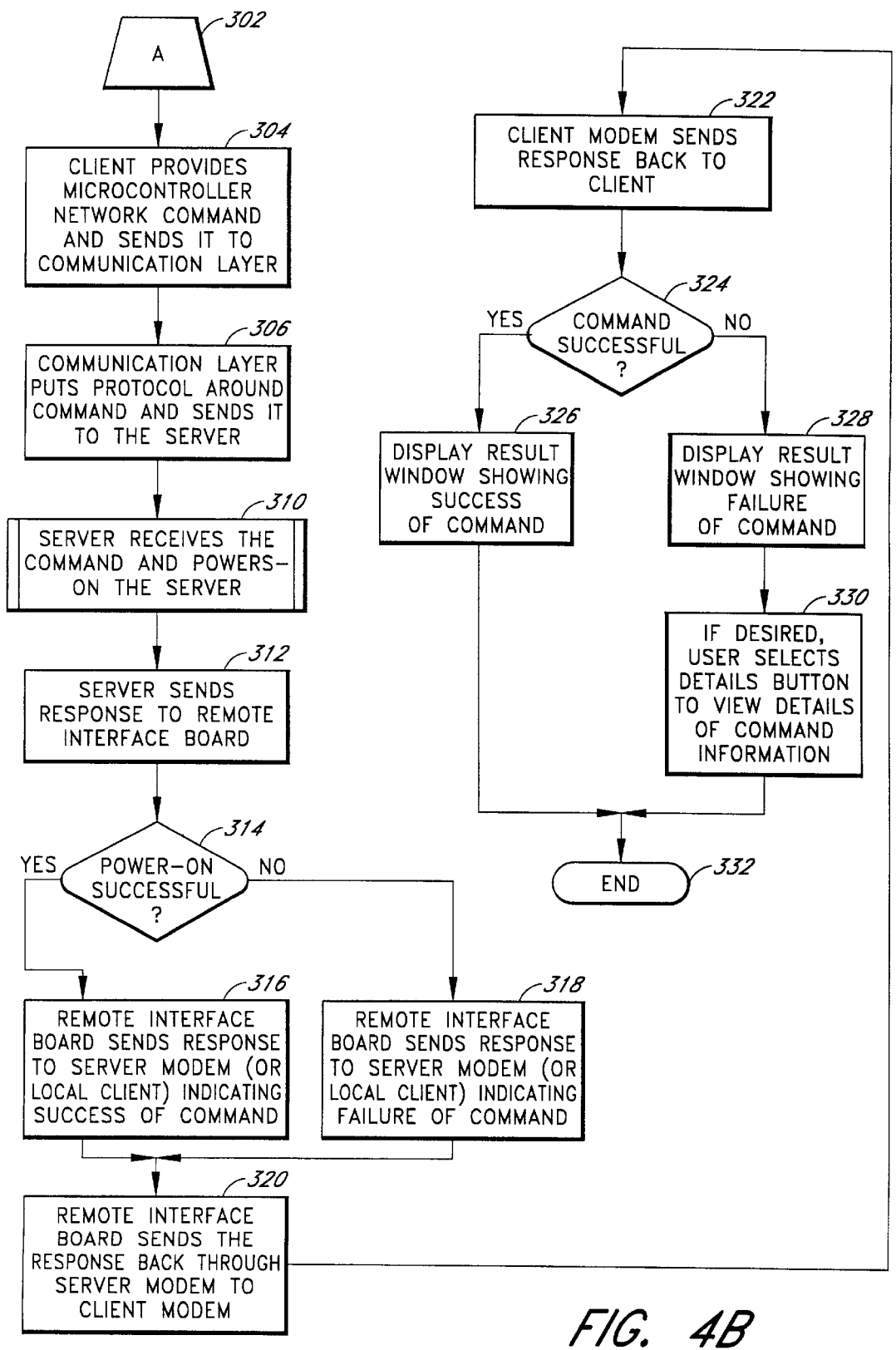

Referring to FIGS. 4*a*, 4*b* and FIG. 1, a Power-On process 270 will now be described. Process 270 begins at start state 272 and if a connection between the client computer 122/124 and the server 100 is already active, process 270 proceeds to directly to state 296. Otherwise, if a connection is not already active, process 270 proceeds to state 273 and utilizes the Recovery Manager software 130 to present a dialog window to the user on a display of the client computer 122/124 requesting information. The user is requested to enter a password for security purposes. The dialog window also has a pair of radio-buttons to select either a serial (local) connection or a modem (remote) connection. If serial is selected, the user is requested to select a COM port. If modem is selected, the user is requested to enter a telephone number to be used in dialing the server modem.

Moving to decision state 274, process 270 determines if a modem-type connection was selected. A modem-type connection is generally utilized in the situation where the client computer 124 is located at a location remote from the server 100. If it is determined at decision state 274 that a modem connection is utilized, process 270 moves to state 276 wherein the client computer 124 is connected to the client modem 128. Moving to state 278, a connection is established between the client modem 128 and the server modem 126 via a communications network 127, as previously described above. Continuing at state 280, the server modem 126 connects with the remote interface 104. Proceeding to state 282, the remote interface 104 connects to the server 100 via the RJ-45 cable 103. Moving to state 286, the Recovery Manager software 130 at the client computer 124 dials the server modem 126 through the client modem 128, handshakes with the remote interface 104, and checks the previously entered password. Process 270 remains at state 286 until a successful communication path with the remote interface 104 is established.

Returning to decision state 274, if a local connection 121 is utilized instead of the modem connection 123, process 270 proceeds to state 288 wherein the local client computer 122 is connected with the remote interface 104. Moving to state 292, the remote interface 104 is connected with the server 100. The previously entered password (at state 273) is sent to the remote interface 104 to identify the user at the local computer 122. If the password matches a password that is stored in the server system 100, the communication path with the remote interface is enabled.

Figure 15:
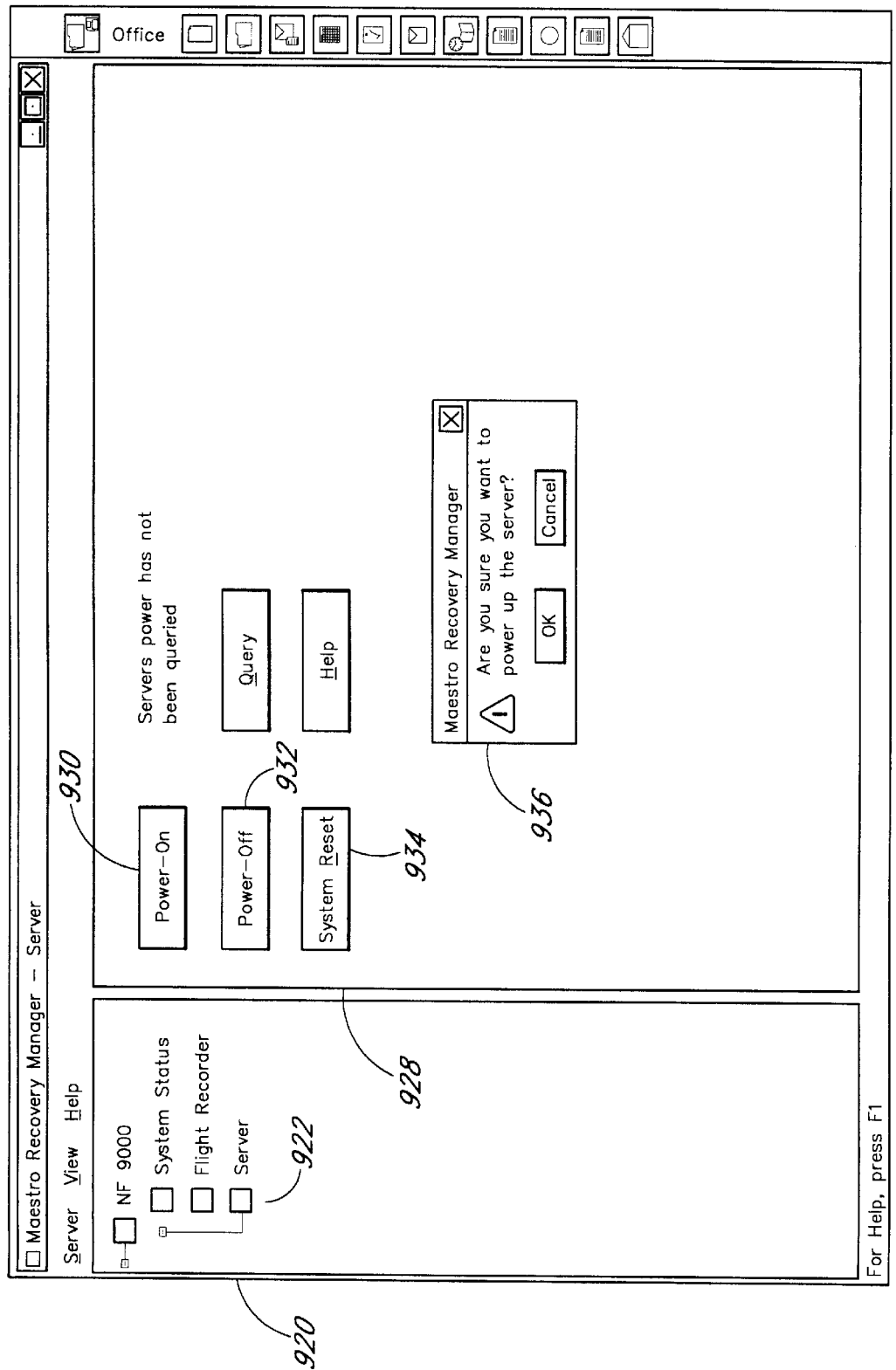
FIG. 15 is an exemplary screen display of a server power-on window seen at the client computer to control the microcontroller network of FIGS. 1 and 2.

After successful modem communication has been established and the password confirmed at state 286, or at the completion of connecting the remote interface to the server and checking the password at state 292, process 270 continues at state 296. At state 296, the Recovery Manager software 130 will in one embodiment display a recovery manager window 920, which includes a server icon 922 as shown in FIG. 15. A server window panel 928 and a confirmation dialog box 936 are not displayed at this time. The user at the client computer 122/124 then selects the server icon on the display, such as, for example by clicking a pointer device on the icon. Moving to state 298, the server window panel 928 is then displayed to the user. The user confirmation box 936 is not displayed at this time. The user selects a Power On button 930 on the window panel 928 to trigger the power-on operation. Continuing at state 300, the user confirmation dialog box 936 is then displayed on the client computer display. If the user confirms that the server is to be powered up, process 270 proceeds through off page connector A 302 to state 304 on FIG. 4*b*.

At state 304, the Recovery Manager software 130 at the client computer 122/124 provides a microcontroller network command (based on selecting the Power On button) and sends it to communication layer software. Proceeding to state 306, the communication layer puts a communications protocol around the command (from state 304) and sends the encapsulated command to the server through the client modem 128, the server modem 126 and the remote interface 104. The communications protocol was discussed in conjunction with FIG. 3 above. The encapsulated command is of the Request type 202 shown in FIG. 3. The remote interface 104 converts the encapsulated command to the microcontroller network format, which is described in U.S. patent application Ser No. 08/942,402, entitled "DIAGNOSTIC AND MANAGING DISTRIBUTED PROCESSOR SYSTEM," and in U.S. patent application Ser. No. 08/942,160, entitled "SYSTEM ARCHITECTURE FOR REMOTE ACCESS AND CONTROL OF ENVIRONMENTAL MANAGEMENT." Process 270 then continues to a function 310 wherein the server receives the command and powers on the server. Function 310 will be further described in conjunction with FIG. 5.

Moving to state 312, the response generated by the server is then sent to the remote interface 104. In one embodiment, the microcontroller (the Chassis controller 170 in this instance) performing the command at the server returns status at the time of initiation of communication with the microcontroller. At the completion of the power-on operation by the Chassis controller 170, the Recovery Manager 130 sends a read status command to the Chassis controller (using states 304 and 306) to retrieve information on the results of the operation.

Proceeding to decision state 314, process 270 determines if the power on command was successful. If so, process 270 proceeds to state 316 wherein the remote interface 104 sends the response to the server modem 126 indicating the success of the command. Alternatively, if a local connection 121 is utilized, the response is sent to the local client computer 122. However, if the power on is not successful, as determined at decision state 314, process 270 proceeds to state 318 wherein the remote interface 104 sends the response to the server modem (or local client computer) indicating a failure of the command. At the conclusion of either state 316 or 318, process 270 proceeds to state 320 wherein the remote interface 104 sends the response back through the server modem 126 to the client modem 128. Moving to state 322, the client modem 128 sends the response back to the Recovery Manager software 130 at the remote client computer 124. Note that if the local connection 121 is being utilized, states 320 and 322 are not necessary. Proceeding to decision state 324, process 270 determines whether the command was successful. If so, process 270 continues at state 326 and displays a result window showing the success of the command on the display at the client computer 122/124. However, if the command was not successful, process 270 proceeds to state 328 wherein a result window showing failure of the command is displayed to the user. Moving to state 330, the details of the command information are available, if the user so desires, by selecting a details button. At the completion of state 326 or state 330, process 270 completes at end state 332.

Figure 5:
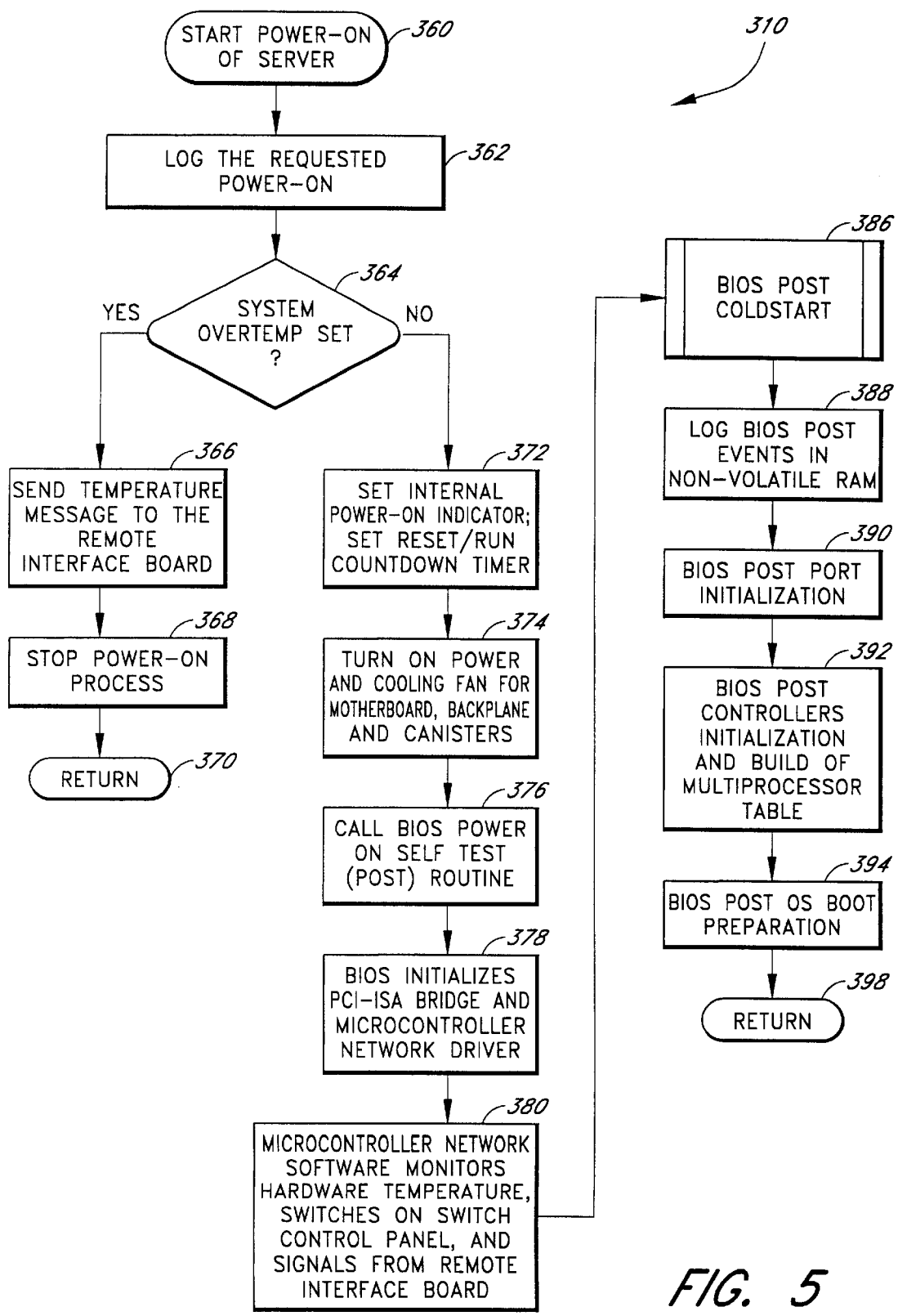
FIG. 5 is one embodiment of a flow diagram of the power-on function shown in FIG. 4b.

Referring to FIG. 5, one embodiment of the server Power On function 310 will now be described. Beginning at start state 360, function 310 proceeds to state 362 and logs the requested power-on to the server 100 in the System Recorder memory 112. Proceeding to decision state 364, function 310 determines if a system over-temperature condition is set. If so, function 310 proceeds to state 366 and sends a over-temperature message to the remote interface 104. Advancing to state 368, because the system over-temperature condition is set, the power-on process is stopped and function 310 returns at a return state 370.

Returning to decision state 364, if the system over-temperature condition is not set, function 310 proceeds to state 372 and sets an internal power-on indicator and a reset/run countdown timer. In one embodiment, the reset/run countdown timer is set to a value of five. Advancing to state 374, function 310 turns on the power and cooling fans for the server system board 150, backplane 152 and I/O canisters. The microcontroller network holds the main system processor reset/run control line in the reset state until the reset/run countdown timer expires to allow the system power to stabilize. When the timer expires then the reset/run control is set to "run" and the system processor(s) begin their startup sequence by proceeding to state 376 and calling a BIOS Power-On Self Test (POST) routine. Moving to state 378, the BIOS initializes a PCI-ISA bridge and a microcontroller network driver. Continuing to state 380, the microcontroller network software monitors: hardware temperatures, switches on a control panel on the server, and signals from the remote interface 104. In one embodiment, state 380 may be performed anywhere during states 376 to 394 because the BIOS operations are performed by the server CPUs 164 (FIG. 2) independently of the microcontroller network 102. Function 310 then moves to a BIOS POST Coldstart function 386. In the Coldstart POST function, approximately 61 BIOS subroutines are called. The major groups of the Coldstart path include: CPU initialization, DMA/timer reset, BIOS image check, chipset initialization, CPU register initialization, CMOS test, PCI initialization, extended memory check, cache enable, and message display.

At the completion of the BIOS POST Coldstart function 386, function 310 proceeds to state 388 where BIOS POST events are logged in the System Recorder memory 112. Proceeding to state 390, the BIOS POST performs server port initialization. Continuing at state 392, the BIOS POST initializes the Operating System related controllers (e.g., floppy controller, hard disk controller) and builds a multi-processor table. Advancing to state 394, the BIOS POST performs an OS boot preparation sequence. Function 310 ends at a return state 398.

VI. POWER-OFF FLOW

Figure 6B:
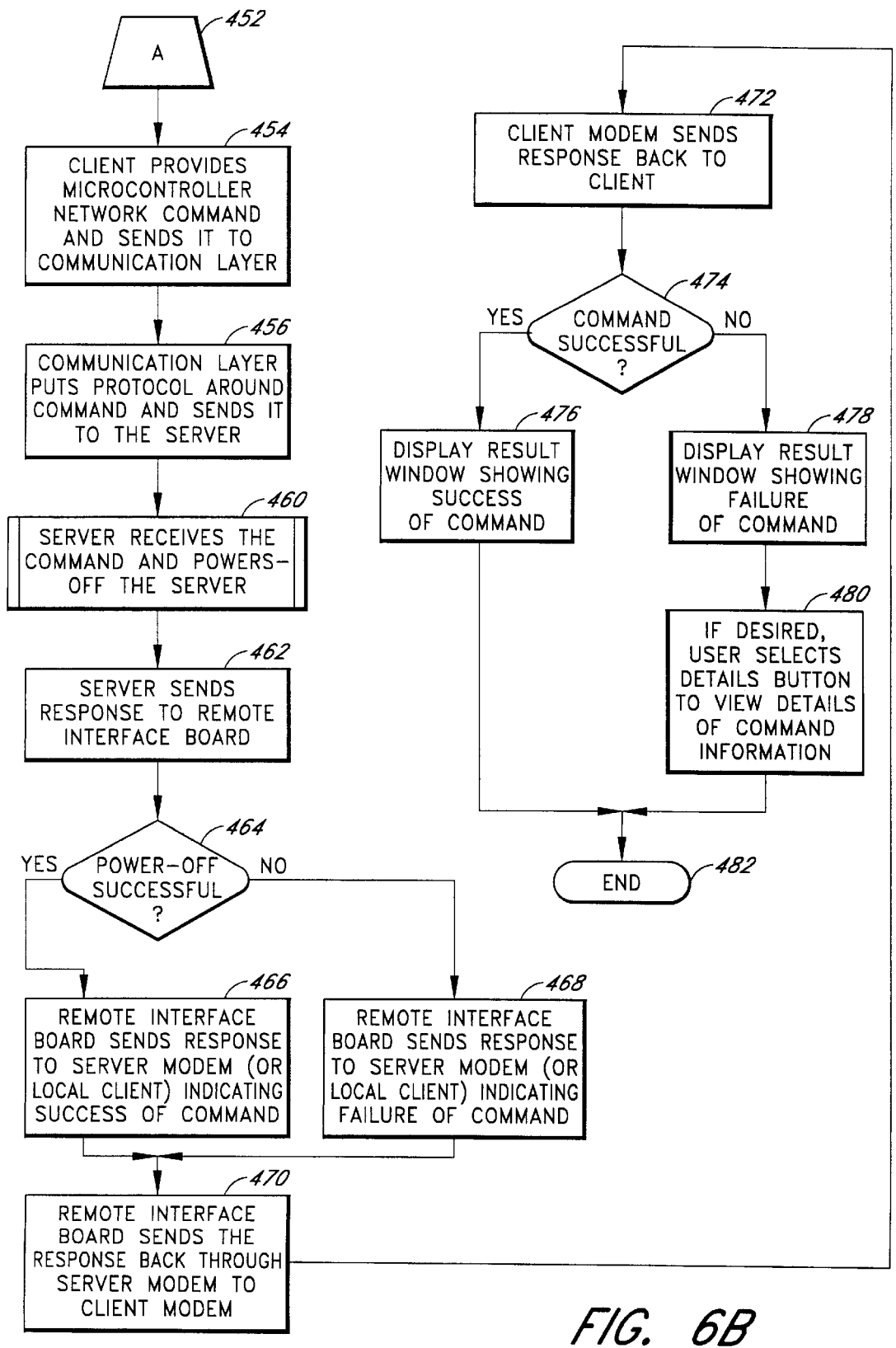

Referring to FIGS. 6a, 6b and FIG. 1, one embodiment of a Power-Off process 420 will now be described. Process 420 begins at start state 422 and if a connection between the client computer 122/124 and the server 100 is already active, process 420 proceeds to directly to state 446. Otherwise, if a connection is not already active, process 420 proceeds to state 423 and utilizes the Recovery Manager software 130 to present a dialog window to the user on a display of the client computer 122/124 requesting information. The user is requested to enter a password for security purposes. The dialog window also has a pair of radio-buttons to select either a serial (local) connection or a modem (remote) connection. If serial is selected, the user is requested to select a COM port. If modem is selected, the user is requested to enter a telephone number to be used in dialing the server modem.

Moving to decision state 424, process 420 determines if the modem-type connection 123 will be utilized. The modem-type connection is generally utilized in the situation where the client computer 124 is located at a location remote from the server 100. If it is determined at decision state 424 that a modem connection is utilized, process 420 moves to state 426 wherein the client computer 124 is connected to the client modem 128. Moving to state 428, a connection is established between the client modem 128 and the server modem 126 via the communications network 127. Continuing at state 430, the server modem 126 connects with the remote interface 104. Proceeding to state 432, the remote interface 104 connects to the server 100 via the RJ-45 cable 103. Moving to state 436, the Recovery Manager software 130 at the client computer 124 dials the server modem 126 through the client modem 128, handshakes with the remote interface 104, and checks the previously entered password. Process 420 remains at state 436 until a successful communication path with the remote interface 104 is established.

Returning to decision state 424, if the local connection 121 is utilized instead of the modem connection 123, process 420 proceeds to state 438 wherein the local client computer 122 is connected with the remote interface 104. Moving to state 442, the remote interface 104 is connected with the server 100. The previously entered password (at state 423) is sent to the remote interface 104 to identify the user at the local computer 122. If the password matches the password that is stored in the server system 100, the communication path with the remote interface 104 is enabled.

After successful modem communication has been established and the password confirmed at state 436, or at the completion of checking the password at state 442, process 420 continues at state 446. At state 446, the Recovery Manager software 130 will in one embodiment display the Recovery Manager window 920, which includes the server icon 922 as shown in FIG. 15. The server window panel 928 and the confirmation dialog box 936 are not displayed at this time. The user at the client computer 122/124 then selects the server icon 922 on the display, such as by clicking the pointer device on the icon. Moving to state 448, the server window panel 928 (FIG. 15) is then displayed to the user. The user selects a Power Off button 932 on the window panel 928 to trigger the power-off operation. Continuing at state 450, a user confirmation dialog box is then displayed on the client computer display. If the user confirms that the server is to be powered down, process 420 proceeds through off page connector A 452 to state 454 on FIG. 6b.

At state 454, the Recovery Manager software 130 at the client computer 122/124 provides a microcontroller network command (based on selecting the Power Off button) and sends it to communication layer software. Proceeding to state 456, the communication layer puts a communications protocol around the command (from state 454) and sends the encapsulated command to the server through the client modem 128, the server modem 126 and the remote interface 104. The encapsulated command is of the Request type 202 shown in FIG. 3. Process 420 then continues to a function 460 wherein the server receives the command and powers off the server. Function 460 will be further described in conjunction with FIG. 7.

Moving to state 462, the response generated by the server is then sent to the remote interface 104. In one embodiment, the microcontroller (the Chassis controller 170 in this instance) performing the command at the server returns status at the time of initiation of communication with the microcontroller. At the completion of the power-off operation by the Chassis controller 170, the Recovery Manager 130 sends a read status command to the Chassis controller (using states 454 and 456) to retrieve information on the results of the operation.

Proceeding to decision state 464, process 420 determines if the power off command was successful. If so, process 420 proceeds to state 466 wherein the remote interface 104 sends the response to the server modem 126 indicating the success of the command. Alternatively, if a local connection 121 is utilized, the response is sent to the local client computer 122. However, if the power off is not successful, as determined at decision state 464, process 270 proceeds to state 468 wherein the remote interface 104 sends the response to the server modem (or local client computer) indicating a failure of the command. At the conclusion of either state 466 or 468, process 420 proceeds to state 470 wherein the remote interface 104 sends the response back through the server modem 126 to the client modem 128. Moving to state 472, the client modem 128 sends the response back to the Recovery Manager software 130 at the remote client computer 124. Note that if the local connection 121 is being utilized, states 470 and 472 are not necessary. Proceeding to decision state 474, process 420 determines whether the command was successful. If so, process 420 continues at state 476 and displays a result window showing the success of the command on the display at the client computer 122/124. However, if the command was not successful, process 420 proceeds to state 478 wherein a result window showing failure of the command is displayed to the user. Moving to state 480, the details of the command information are available, if the user so desires, by selecting a details button. At the completion of state 476 or state 480, process 420 completes at end state 482.

Figure 7:
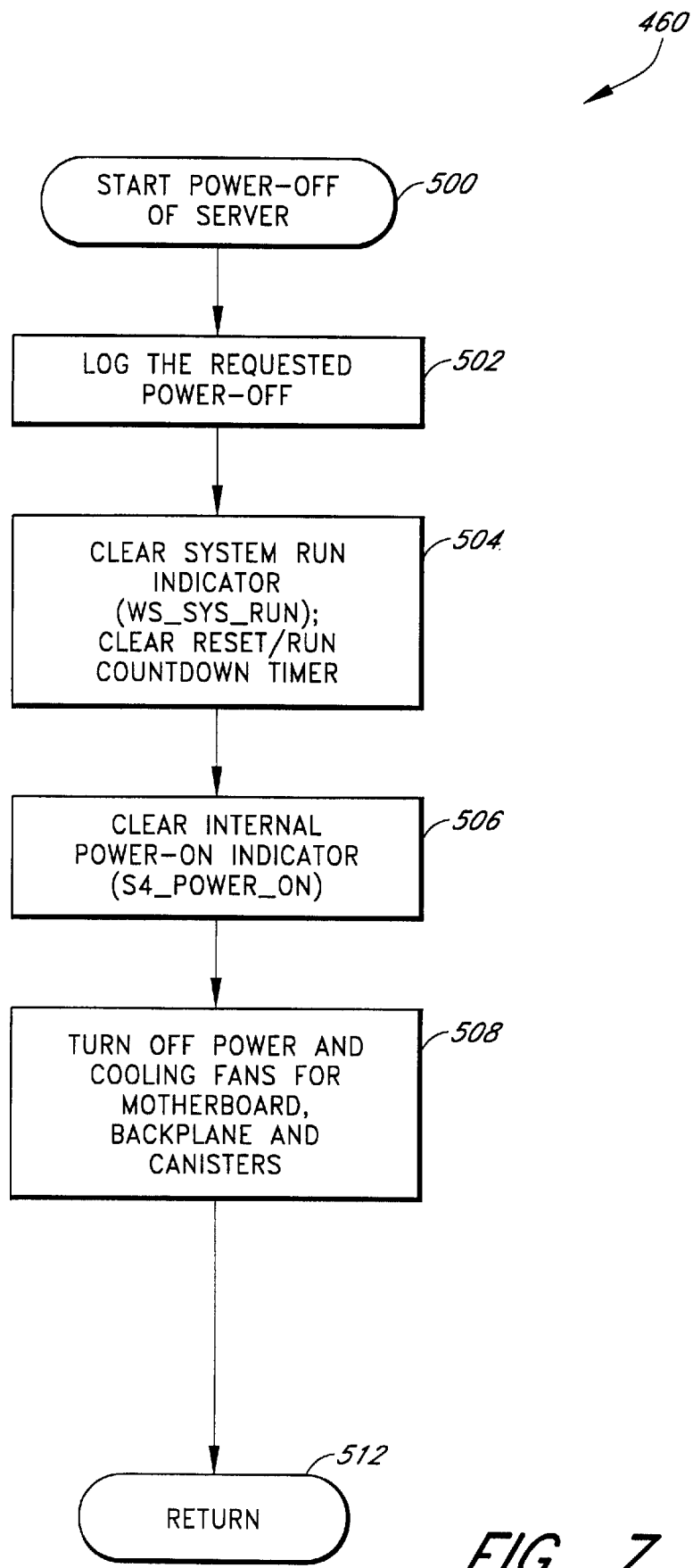
FIG. 7 is one embodiment of a flow diagram of the power-off function shown in FIG. 6b.

Referring to FIG. 7, the server Power-Off function 460 will now be described. Beginning at start state 500, function 460 proceeds to state 502 and logs the requested Power-Off message in the System Recorder memory 112 (FIG. 2) by use of the System Recorder controller 110. Moving to state 504, function 460 clears a system run indicator and clears the reset/run countdown timer. Moving to state 506, function 460 clears an internal power-on indicator. In one embodiment, the power-on indicator is stored by a variable "S4_power_on". Function 460 utilizes the CPU A controller 166 for state 504 and the Chassis controller 170 for state 506. Continuing at state 508, function 460 turns off the power and the cooling fans for the system board 150, the backplane 152 and the canister(s) associated with the Canister controllers 172–178. Function 460 ends at a return state 512.

VII. RESET FLOW

Figure 8B:
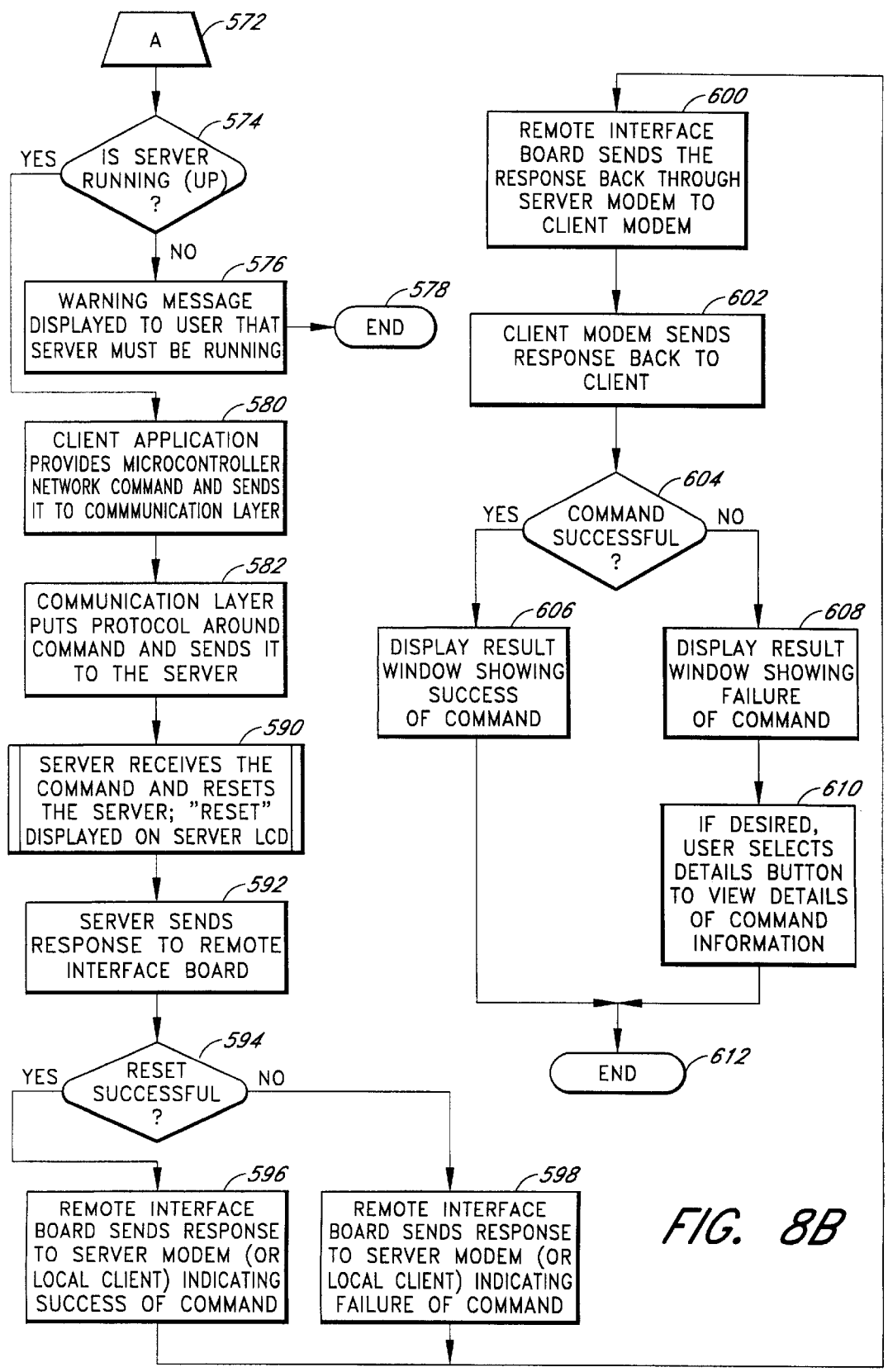

Referring to FIGS. 8a, 8b and FIG. 1, one embodiment of a Reset process 540 will now be described. Process 540 begins at start state 542 and if a connection between the client computer 122/124 and the server 100 is already active, process 540 proceeds to directly to state 566. Otherwise, if a connection is not already active, process 540 proceeds to state 543 and utilizes the Recovery Manager software 130 to present a dialog window to the user on a display of the client computer 122/124 requesting information. The user is requested to enter a password for security purposes. The dialog window also has a pair of radio-buttons to select either a serial (local) connection or a modem (remote) connection. If serial is selected, the user is requested to select a COM port. If modem is selected, the user is requested to enter a telephone number to be used in dialing the server modem.

Moving to decision state 544, process 540 determines if the modem-type connection 123 was selected. The modem-type connection is generally utilized in the situation where the client computer 124 is located at a location remote from the server 100. If it is determined at decision state 544 that a modem connection is utilized, process 540 moves to state 546 wherein the client computer 124 is connected to the client modem 128. Moving to state 548, a connection is established between the client modem 128 and the server modem 126 via the communications network 127. Continuing at state 550, the server modem 126 connects with the remote interface 104. Proceeding to state 552, the remote interface 104 connects to the server 100 via the RJ-45 cable 103. Moving to state 556, the Recovery Manager software 130 at the client computer 124 dials the server modem 126 through the client modem 128, handshakes with the remote interface 104, and checks the previously entered password. Process 540 remains at state 556 until a successful communication path with the remote interface 104 is established.

Returning to decision state 544, if the local connection 121 is utilized instead of the modem connection 123, process 540 proceeds to state 558 wherein the local client computer 122 is connected with the remote interface 104. Moving to state 562, the remote interface 104 is connected with the server 100. The password previously entered (at state 543) is sent to the remote interface 104 to identify the user at the local computer 122. If the password matches the password that is stored in the server system 100, the communication path with the remote interface 104 is enabled.

After successful modem communication has been established and the password confirmed at state 556, or at the completion of connecting the remote interface to the server and checking the password at state 562, process 540 continues at state 566. At state 566, the Recovery Manager software 130 will in one embodiment display the Recovery Manager window 920, which includes the server icon 922 as shown in FIG. 15. The server window panel 928 and the confirmation dialog box 936 are not displayed at this time. The user at the client computer 122/124 then selects the server icon 922 on the display, such as by clicking the pointer device on the icon. Moving to state 568, the server window panel 928 (FIG. 15) is then displayed to the user. The user confirmation box 936 is not displayed at this time. The user selects a System Reset button 934 on the window panel 928 to trigger the System Reset operation. Continuing at state 570, a user confirmation dialog box is then displayed on the client computer display. If the user confirms that the system is to be reset, process 540 proceeds through off page connector A 572 to decision state 574 on FIG. 8*b*.

At decision state 574, process 540 determines if the server is currently running (powered up, such as after a power on command has been issued). If not, process 540 continues to state 576 wherein a warning message that the server must be running to execute a system reset is displayed on the client computer display to the user. After the warning has been displayed, process 540 moves to end state 578 to terminate the reset process. However, if the server is running, as determined at decision state 574, process 540 proceeds to state 580.

At state 580, the Recovery Manager software 130 at the client computer 122/124 provides a microcontroller network command (based on selecting the System Reset button) and sends it to the communication layer software. Proceeding to state 582, the communication layer puts a communications protocol around the command (from state 580) and sends the encapsulated command to the server through the client modem 128, the server modem 126 and the remote interface 104. The encapsulated command is of the Request type 202 shown in FIG. 3. Process 540 then continues to a function 590 wherein the server receives the command and resets the server. Function 590 will be further described in conjunction with FIG. 9.

Moving to state 592, the response generated by the server is then sent to the remote interface 104. In one embodiment, the microcontroller (the CPU A controller 166 in this instance) performing the command at the server returns status at the time of initiation of communication with the microcontroller. At the completion of the reset operation by the CPU A controller 166, the Recovery Manager 130 sends a read status command to the CPU A controller (using states 580 and 582) to retrieve information on the results of the operation.

Proceeding to decision state 594, process 540 determines if the system reset command was successful. If so, process 540 proceeds to state 596 wherein the remote interface 104 sends the response to the server modem 126 indicating the success of the command. Alternatively, if a local connection 121 is utilized, the response is sent to the local client computer 122. However, if the system reset is not successful, as determined at decision state 594, process 540 proceeds to state 598 wherein the remote interface 104 sends the response to the server modem (or local client computer) indicating a failure of the command. At the conclusion of either state 596 or 598, process 540 proceeds to state 600 wherein the remote interface 104 sends the response back through the server modem 126 to the client modem 128. Moving to state 602, the client modem 128 sends the response back to the Recovery Manager software 130 at the remote client computer 124. Note that if the local connection 121 is being utilized, states 600 and 602 are not necessary. Proceeding to decision state 604, process 540 determines whether the command was successful. If so, process 540 continues at state 606 and displays a result window showing the success of the command on the display at the client computer 122/124. However, if the command was not successful, process 540 proceeds to state 608 wherein a result window showing failure of the command is displayed to the user. Moving to state 610, the details of the command information are available, if the user so desires, by selecting a details button. At the completion of state 606 or state 610, process 540 completes at end state 612.

Figure 9:
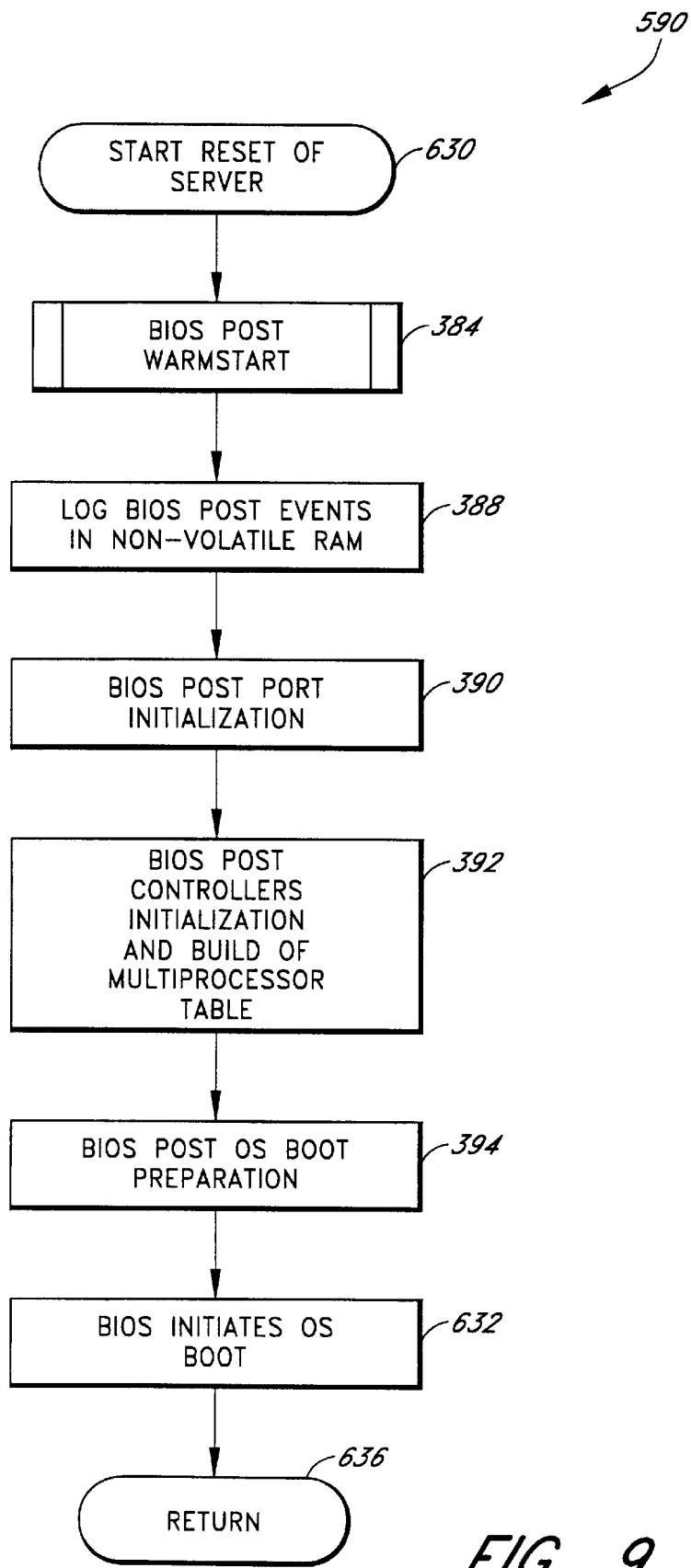
FIG. 9 is one embodiment of a flow diagram of the reset function shown in FIG. 8b.

Referring to FIG. 9, the server reset function 590 will now be described. Beginning at start state 630, function 590 proceeds to the BIOS POST Warmstart function 384. In the Warmstart function 384, approximately 41 subroutines are called. These include the general operations of: reset flag, DMA/timer reset, chipset initialization, CMOS test, PCI initialization, cache enable, and message display. At the completion of the BIOS POST Warmstart function 384, function 590 proceeds to state 388 where BIOS POST events are logged in the System Recorder memory 112. Proceeding to state 390, the BIOS POST performs server port initialization. Continuing at state 392, the BIOS POST initializes the Operating System related controllers (e.g., floppy disk controller, hard disk controller) and builds a multi-processor table. Advancing to state 394, the BIOS POST performs an OS boot preparation sequence. Moving to state 632, the BIOS initiates an OS boot sequence to bring the operating software to an operational state. Function 590 ends at a return state 636.

VIII. FLIGHT RECORDER FLOW

A Flight Recorder, which includes the System Recorder controller 110 and the System Recorder memory 112, provides a subsystem for recording a time-stamped history of events leading up to a failure in server system 100. The System Recorder memory 112 may also store identification of components of the server system. In one embodiment, the System Recorder 110 is the only controller which does not initiate messages to other controllers. The System Recorder 110 receives event log information from other controllers and stores the data into the System Recorder memory 112. Upon request, the System Recorder 110 can send a portion and/or the entire logged data to a requesting controller. The System Recorder 110 puts a time stamp from a real-time clock with the data that is saved.

Figure 10B:
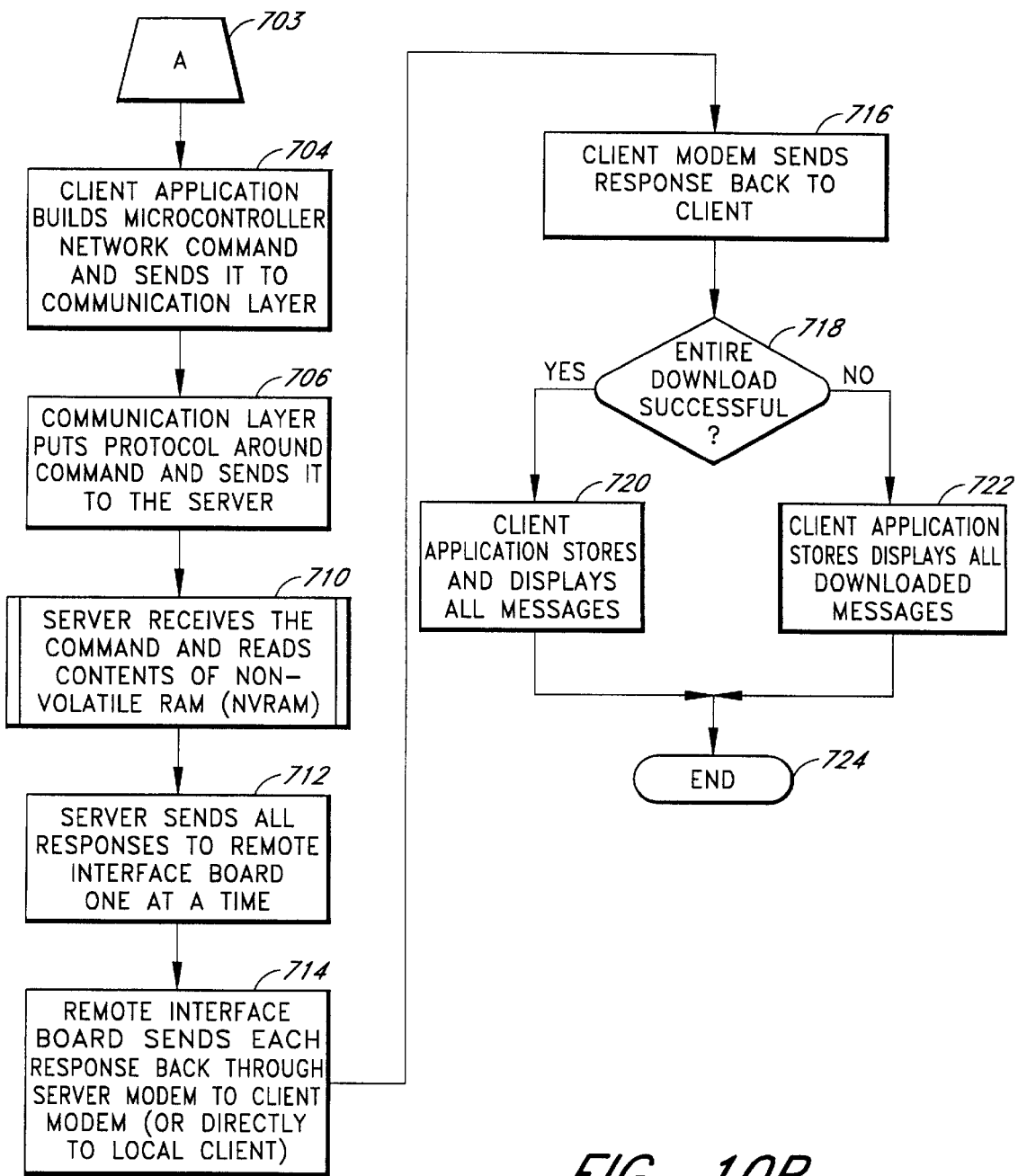

Referring to FIGS. 10*a*, 10*b* and FIG. 1, one embodiment of a Display Flight Recorder process 670 will now be described. Process 670 begins at start state 672 and if a connection between the client computer 122/124 and the server 100 is already active, process 670 proceeds to directly to state 696. Otherwise, if a connection is not already active, process 670 proceeds to state 673 and utilizes the Recovery Manager software 130 to present a dialog window to the user on a display of the client computer 122/124 requesting information. The user is requested to enter a password for security purposes. The dialog window also has a pair of radio-buttons to select either a serial (local) connection or a modem (remote) connection. If serial is selected, the user is requested to select a COM port. If modem is selected, the user is requested to enter a telephone number to be used in dialing the server modem.

Moving to decision state 674, process 670 determines if the modem-type connection 123 was selected. The modem-type connection is generally utilized in the situation where the client computer 124 is located at a location remote from the server 100. If it is determined at decision state 674 that a modem connection is utilized, process 670 moves to state 676 wherein the client computer 124 is connected to the client modem 128. Moving to state 678, a connection is established between the client modem 128 and the server modem 126 via the communications network 127. Continuing at state 680, the server modem 126 connects with the remote interface 104. Proceeding to state 682, the remote interface 104 connects to the server 100 via the RJ-45 cable 103. Moving to state 686, the Recovery Manager software 130 at the client computer 124 dials the server modem 126 through the client modem 128, handshakes with the remote interface 104, and checks the previously entered password. Process 670 remains at state 686 until a successful communication path with the remote interface 104 is established.

Returning to decision state 674, if the local connection 121 is utilized instead of the modem connection 123, process 670 proceeds to state 688 wherein the local client computer 122 is connected with the remote interface 104. Moving to state 692, the remote interface 104 is connected with the server 100. The previously entered password (at state 673) is sent to the remote interface 104 to identify the user at the local computer 122. If the password matches the password that is stored in the server system 100, the communication path with the remote interface 104 is enabled.

Figure 16:
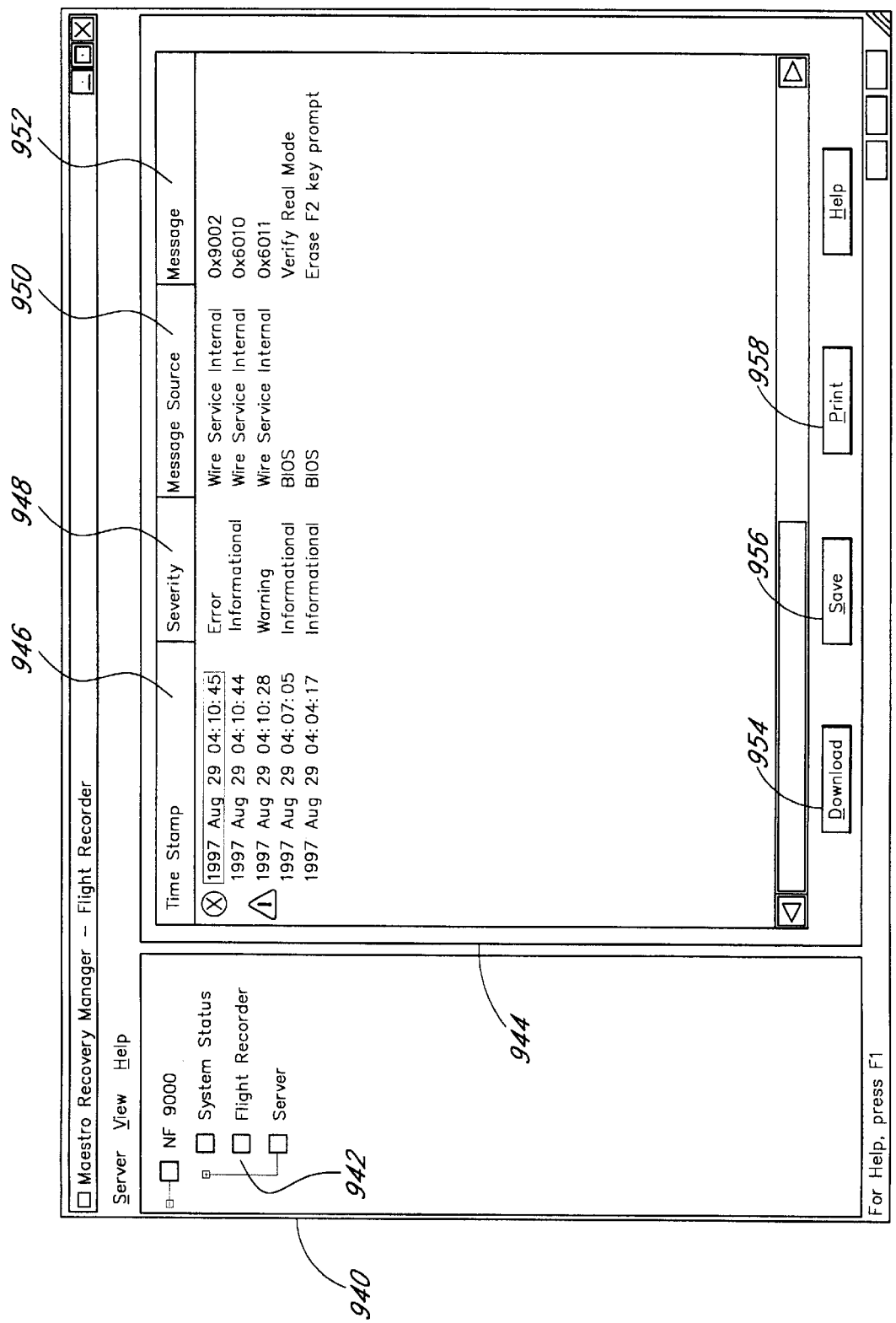
FIG. 16 is an exemplary screen display of a flight recorder window seen at the client computer to control the microcontroller network of FIGS. 1 and 2.

After successful modem communication has been established and the password confirmed at state 686, or at the completion of connecting the remote interface to the server and checking the password at state 692, process 670 continues at state 696. At state 696, the Recovery Manager software 130 will in one embodiment display a Recovery Manager window 940, which includes a Flight Recorder icon 942 as shown in FIG. 16. A Flight Recorder window panel 944 is not displayed at this time. The user at the client computer 122/124 then selects the Flight Recorder icon 942 on the display, such as by clicking the pointer device on the icon. Moving to state 698, the Flight Recorder window panel 944 (FIG. 16) is then displayed to the user. The user selects a Download button 954 on the window panel 944 to trigger the display of the Flight Recorder operation. Note that other options in the Flight Recorder window panel 944 include a Save button 956 for saving a downloaded Flight Recorder (system log or System Recorder memory 112, FIG. 1) and a Print button 958 for printing the downloaded Flight Recorder. Continuing at state 700, a user confirmation dialog box (not shown) is then displayed on the client computer display showing a number of messages in the server system log. Moving to state 702, if the user selects the "OK" button, process 670 displays a progress window of downloaded messages. Process 670 proceeds through off page connector A 703 to state 704 on FIG. 10b.

At state 704, the Recovery Manager software 130 at the client computer 122/124 provides a microcontroller network command (based on selecting the Download Flight Recorder button 954) and sends it to the communication layer software. Proceeding to state 706, the communication layer puts a communications protocol around the command (from state 704) and sends the encapsulated command to the server through the client modem 128, the server modem 126 and the remote interface 104. The encapsulated command is of the Request type 202 shown in FIG. 3. Process 670 then continues to a function 710 wherein the server receives the command and reads the contents of the System Recorder memory 112 (FIG. 1). In one embodiment, each read request generates one response such that the Recovery Manager 130 generates multiple read requests to read the complete system log. The server generates one log response during function 710. Function 710 will be further described in conjunction with FIG. 11.

Moving to state 712, each of the responses generated by the server are then sent one at a time to the remote interface 104. Process 670 then proceeds to state 714 wherein the remote interface 104 sends each response back through the server modem 126 to the client modem 128. Alternatively, if a local connection 121 is utilized, each response is sent directly to the local client computer 122. Moving to state 716, the client modem 128 sends the response back to the Recovery Manager software 130 at the remote client computer 124. Note that if the local connection 121 is being utilized, state 716 is not necessary. Proceeding to decision state 718, process 670 determines whether the entire download of the Flight Recorder was successful by checking for an end of system log messages status. If so, process 670 continues at state 720 wherein the Recovery Manager 130 (FIG. 1) displays (and optionally stores) all messages in the Flight Recorder window panel 944 on the display at the client computer 122/124. However, if the entire download was not successful, process 670 proceeds to state 722 wherein the Recovery Manager 130 displays (and optionally stores) all messages that were received by the Recovery Manager 120 in the Flight Recorder window panel 944. At the completion of state 720 or state 722, process 670 completes at end state 724.

Figure 12A:
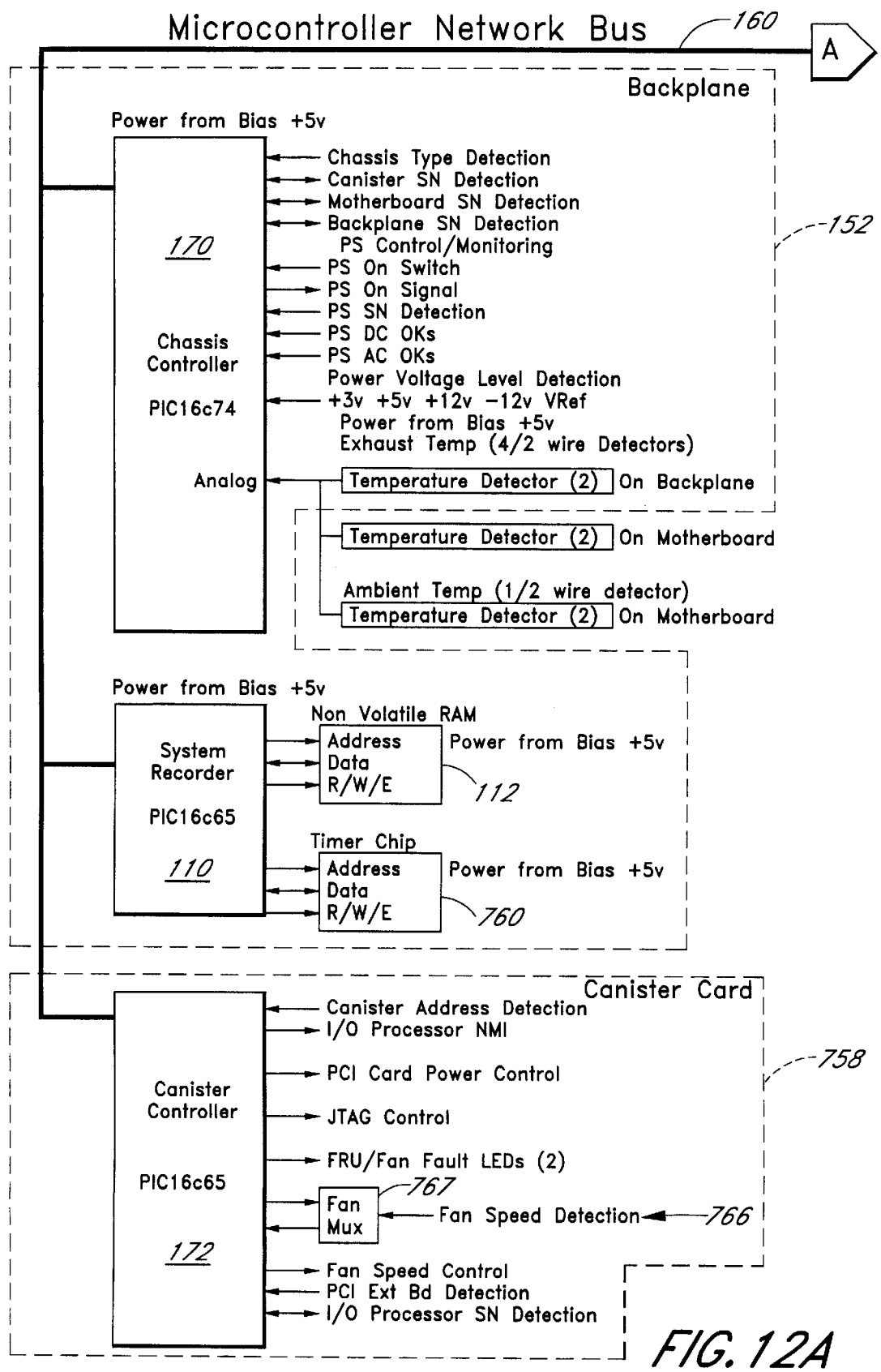
FIG. 12a, 12b and 12c are a detailed block diagram of the microcontroller network components showing a portion of the inputs and outputs of the microcontrollers shown in FIG. 2.

In one embodiment, the Flight Recorder window panel 944 includes four fields: Time Stamp 946, Severity 948, Message Source 950, and Message 952. Each message in the system log 112 includes a time stamp 946 of when the item was written to the log 112. The time stamp includes the date and the local time zone of the client computer 122/124 running the Recovery Manager 130. In one embodiment, the time stamp information is generated by a timer chip 760 (FIG. 12a). The Severity field 948 includes a severity value selected from: unknown, informational, warning, error, and severe/fatal. The Message Source field 950 includes a source selected from: microcontroller network internal, onboard diagnostics, external diagnostics, BIOS, time synchronizer, Windows®, WindowsNT®, NetWare, OS/2, UNIX, and VAX/VMS. The messages in the Message field 952 correspond to the data returned by the controllers on the microcontroller network 102. The controller message data is used to access a set of Message tables associated with the Recovery Manager 130 on the client computer 122/124 to generate the information displayed in the Message field 952. The Message tables include a microcontroller network (wire services) table, a BIOS table and a diagnostics table. An exemplary message from the microcontroller network table includes "temperature sensor #5 exceeds warning threshold". An exemplary message from the BIOS table includes "check video configuration against CMOS". An exemplary message from the diagnostics table includes "correctable memory error".

Figure 11:
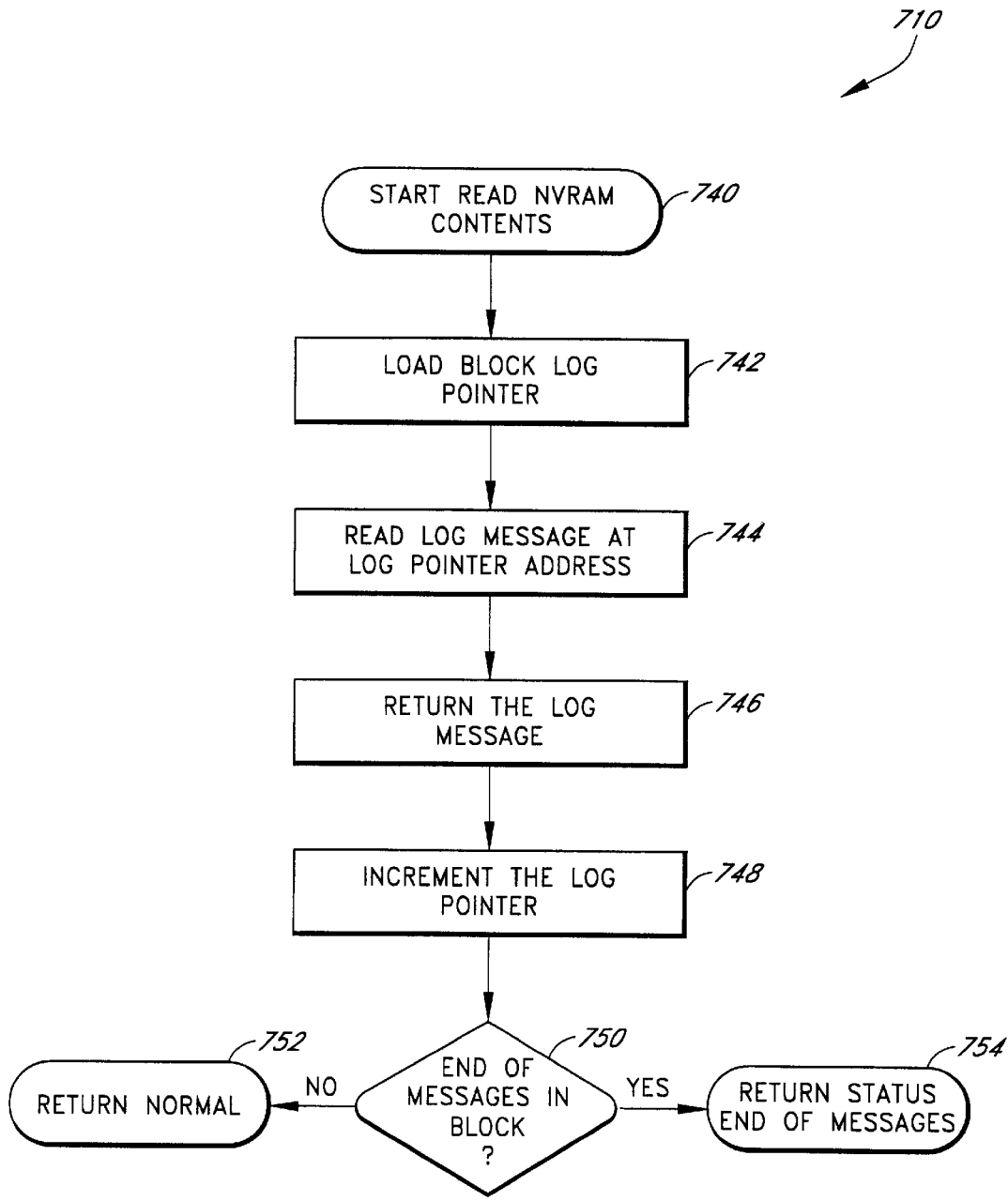
FIG. 11 is one embodiment of a flow diagram of the read non-volatile RAM (NVRAM) contents function shown in FIG. 10b.

Referring to FIG. 11, the Read NVRAM Contents function 710 will now be described. Beginning at start state 740, function 710 proceeds to state 742 and loads a block log pointer. The System Recorder memory or NVRAM 112 (FIG. 2) has two 64 K byte memory blocks. The first block is a memory block which stores ID codes of the devices installed in the network. Hence, a command addressed to the first block is typically generated by a controller responsible for updating the presence or absence of devices in the network. The second block of the memory 112 is a memory block that stores event messages in connection with events occurring in the network. Hence, controllers addressing the second block do so to add entries to the system log or to read previous entries contained in the system log. The System Recorder uses log address pointers to determine where the next new entry in the log should be placed and also to determine where the log is currently being read from. A further description of the System Recorder 110 and the NVRAM 112 is provided in U.S. patent application Ser. No. 08/942,381, entitled, "BLACK BOX RECORDER FOR INFORMATION SYSTEM EVENTS".

Moving to state 744, function 710 reads the log message as addressed by the log pointer. Proceeding to state 746, function 710 returns the log message to the requestor on the microcontroller bus 160 (FIG. 2), which is the remote interface controller 200 in this situation. In one embodiment, the remote interface 104 stores the message in a memory 762 (FIG. 12c) on the RIB. Proceeding to state 748, process 710 increments the log pointer to point to the next address in the NVRAM block. Continuing at decision state 750, function 710 determines if the end of the messages in the System Recorder memory block has been reached. If not, function 710 proceeds to a normal return state 752. If the end of the messages has been reached, as determined at decision state 750, function 710 moves to a return state 754 and returns a End of Messages status. The Recovery Manager 130 utilizes this status information to stop sending requests to read the System Recorder memory 112.

IX. SYSTEM STATUS FLOW

Figure 12B:
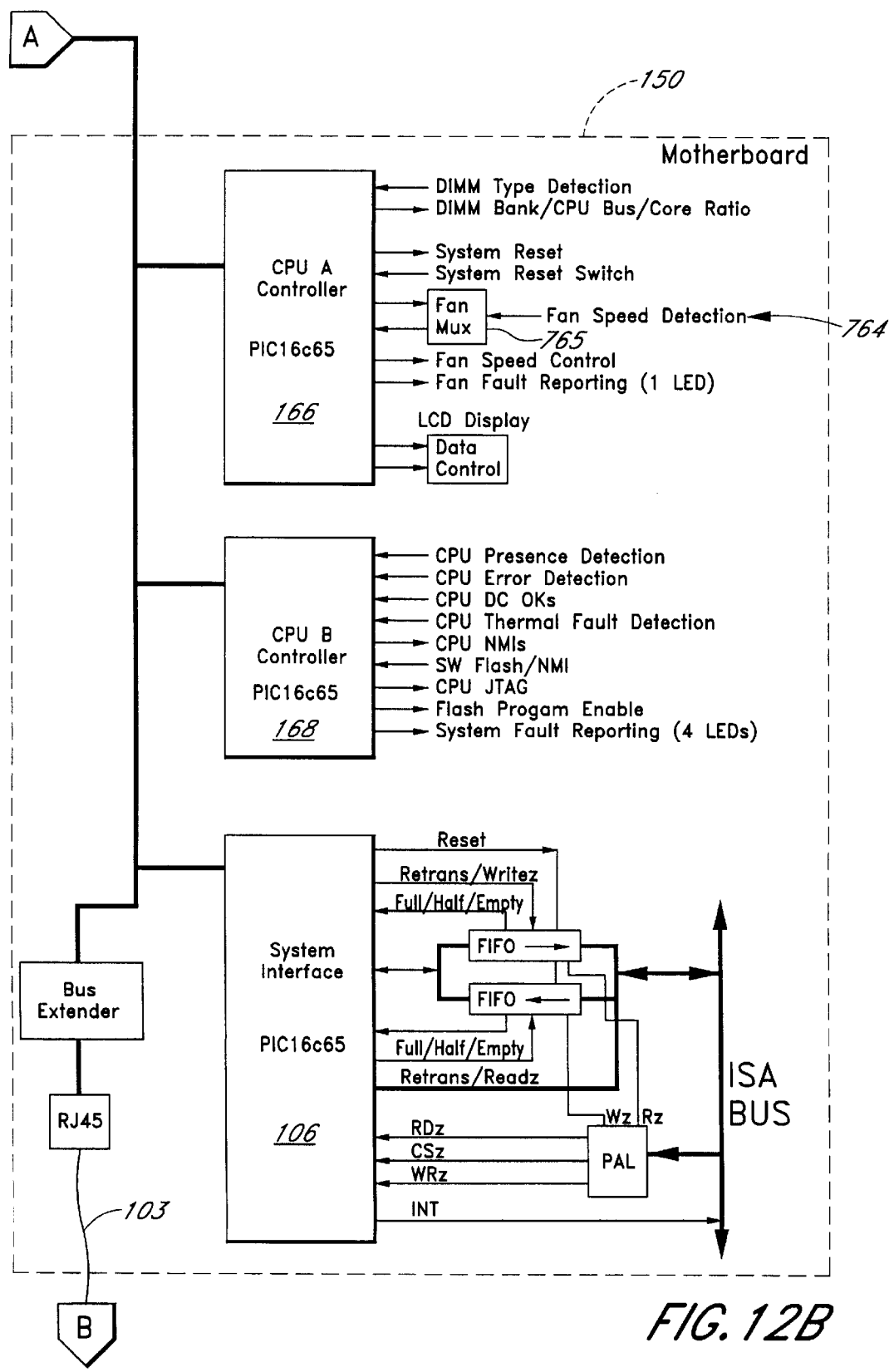
Figure 12C:
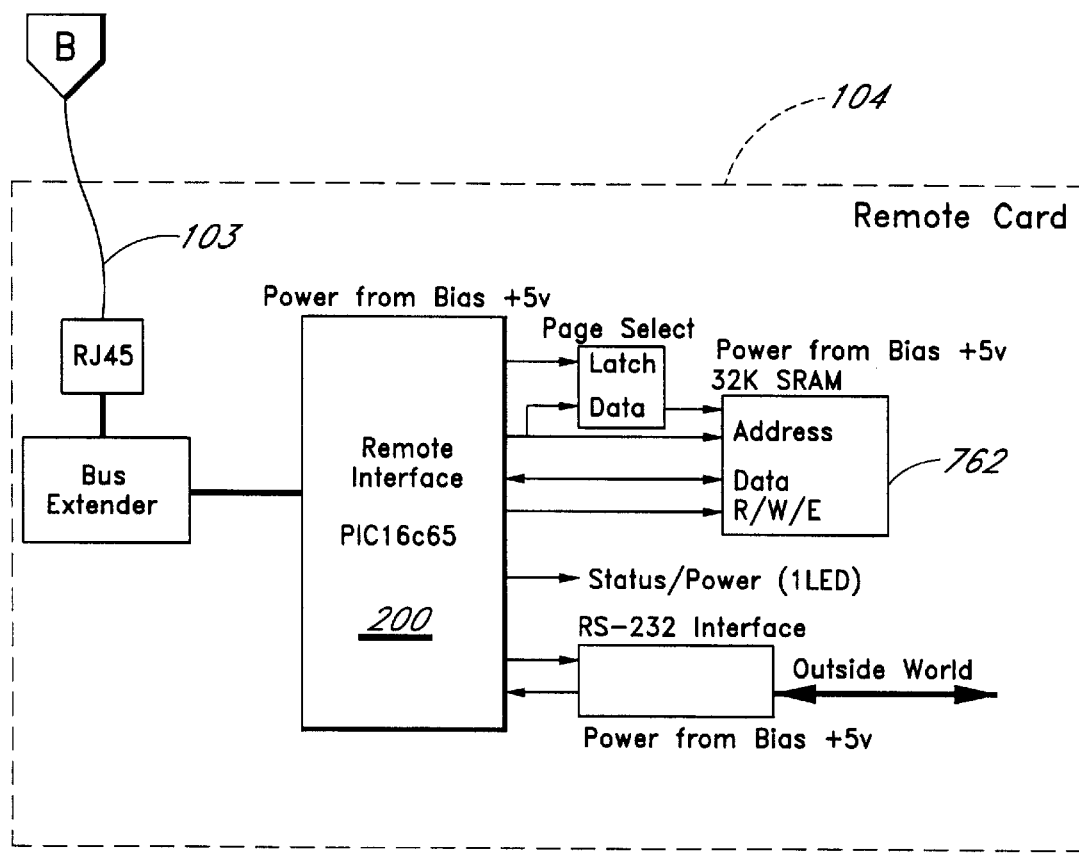

FIGS. 12a, 12b and 12c are a detailed block diagram of the microcontroller network components showing specific inputs and outputs of the microcontrollers. An I/O Canister card 758 has fan speed detection circuitry 765 to provide fan speed information to the Canister controller 172 through a fan multiplexer 767. The CPU A controller 166 receives fan speed information from fan speed detection circuitry 764 through a fan multiplexer 765.

Figure 13A:
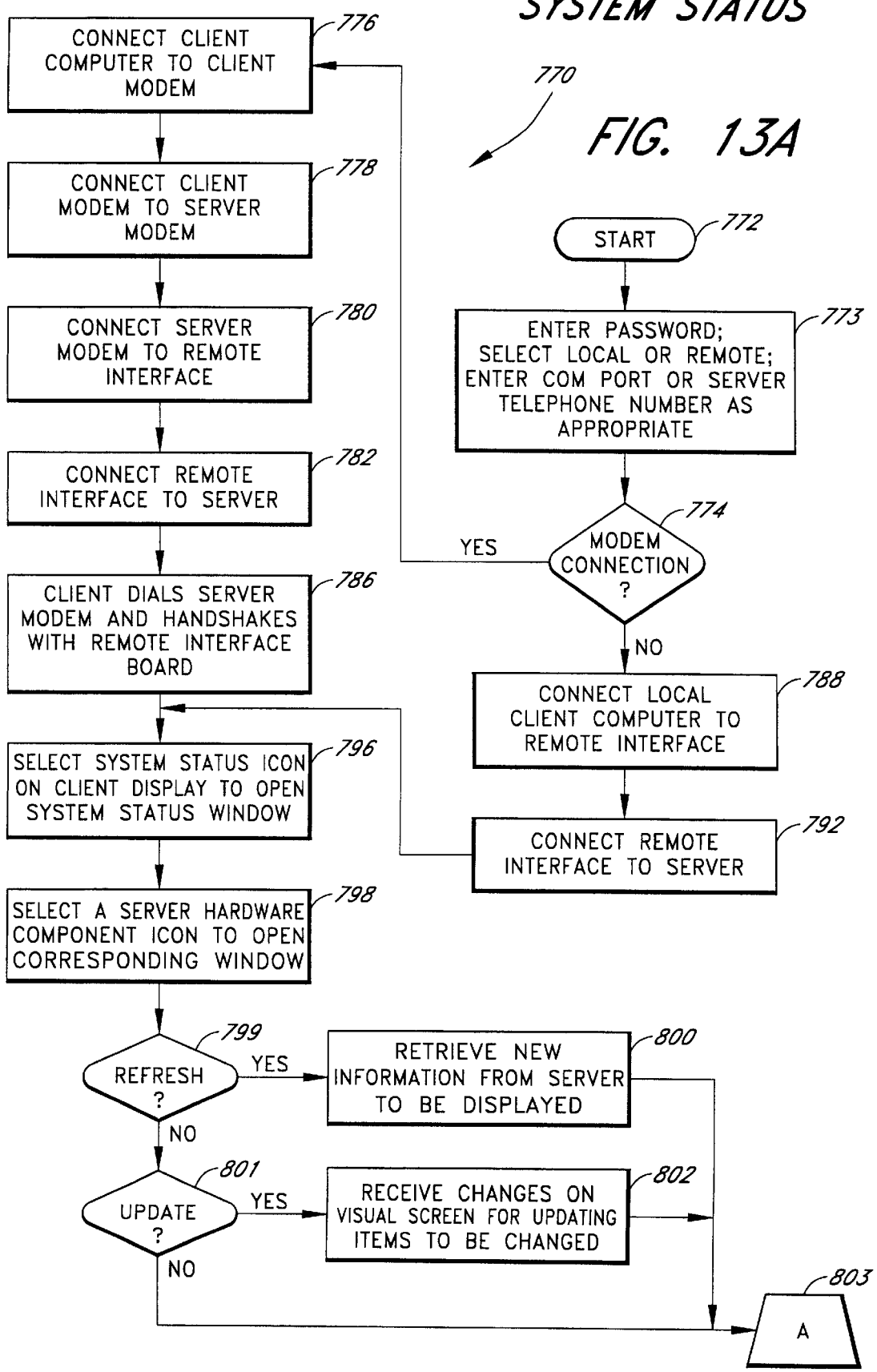
FIGS. 13a and 13b are one embodiment of a flow diagram of a system status process performed by the microcontroller network and client computer of FIGS. 1 and 2.
Figure 13B:
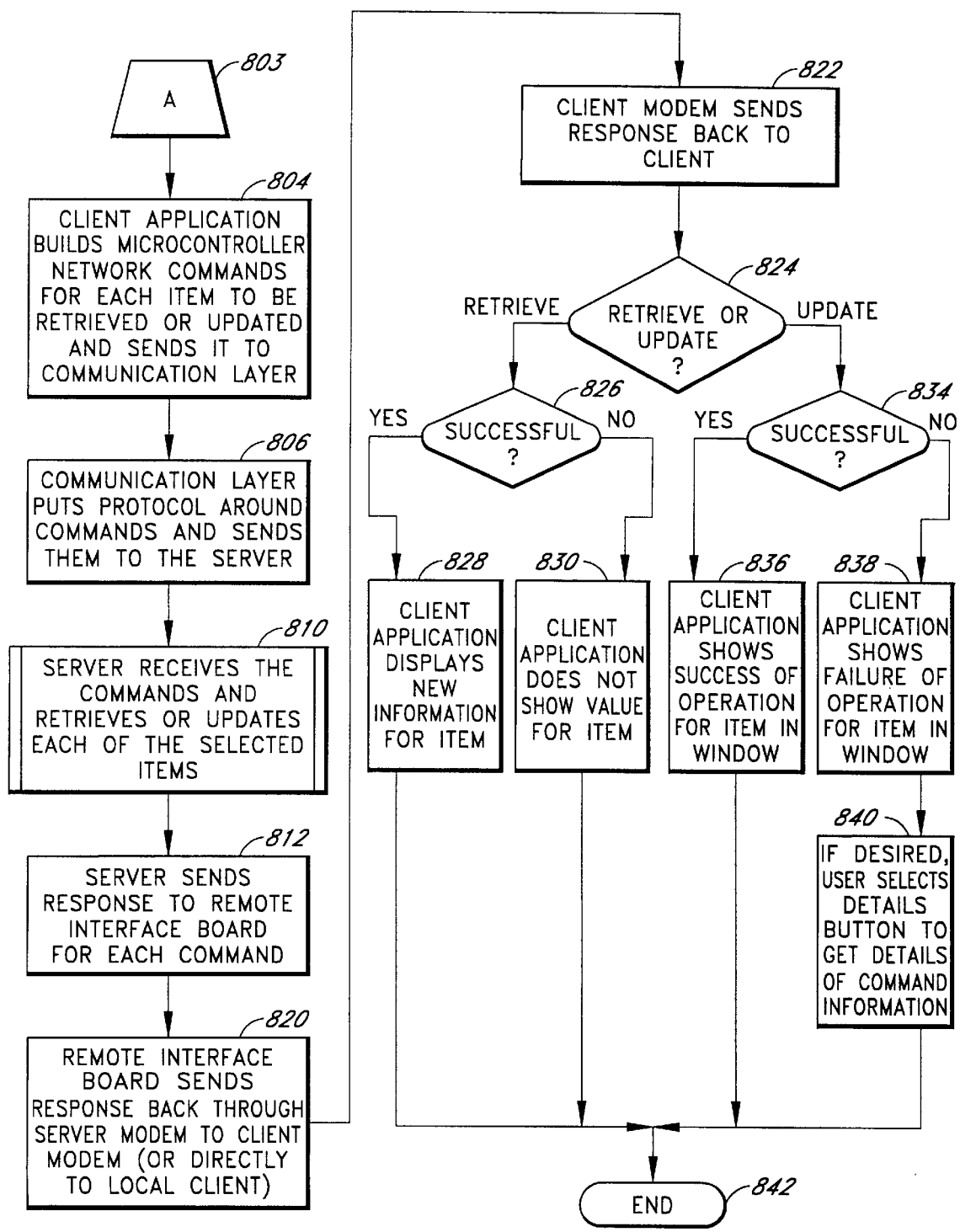

Referring to FIGS. 13a, 13b and FIG. 1, one embodiment of a System Status process 770 will now be described. Process 770 begins at start state 772 and if a connection between the client computer 122/124 and the server 100 is already active, process 770 proceeds to directly to state 796. Otherwise, if a connection is not already active, process 770 proceeds to state 773 and utilizes the Recovery Manager software 130 to present a dialog window to the user on a display of the client computer 122/124 requesting information. The user is requested to enter a password for security purposes. The dialog window also has a pair of radio-buttons to select either a serial (local) connection or a modem (remote) connection. If serial is selected, the user is requested to select a COM port. If modem is selected, the user is requested to enter a telephone number to be used in dialing the server modem.

Moving to decision state 774, process 770 determines if the modem-type connection 123 was selected. The modem-type connection is generally utilized in the situation where the client computer 124 is located at a location remote from the server 100. If it is determined at decision state 774 that a modem connection is utilized, process 770 moves to state 776 wherein the client computer 124 is connected to the client modem 128. Moving to state 778, a connection is established between the client modem 128 and the server modem 126 via the communications network 127. Continuing at state 780, the server modem 126 connects with the remote interface 104. Proceeding to state 782, the remote interface 104 connects to the server 100 via the RJ-45 cable 103. Moving to state 786, the Recovery Manager software 130 at the client computer 124 dials the server modem 126 through the client modem 128, handshakes with the remote interface 104, and checks the previously entered password. Process 770 remains at state 786 until a successful communication path with the remote interface 104 is established.

Retuning to decision state 774, if the local connection 121 is utilized instead of the modem connection 123, process 770 proceeds to state 788 wherein the local client computer 122 is connected with the remote interface 104. Moving to state 792, the remote interface 104 is connected with the server 100. The previously entered password (at state 773) is sent to the remote interface 104 to identify the user at the local computer 122. If the password matches the password that is stored in the server system 100, the communication path with the remote interface 104 is enabled.

Figure 17:
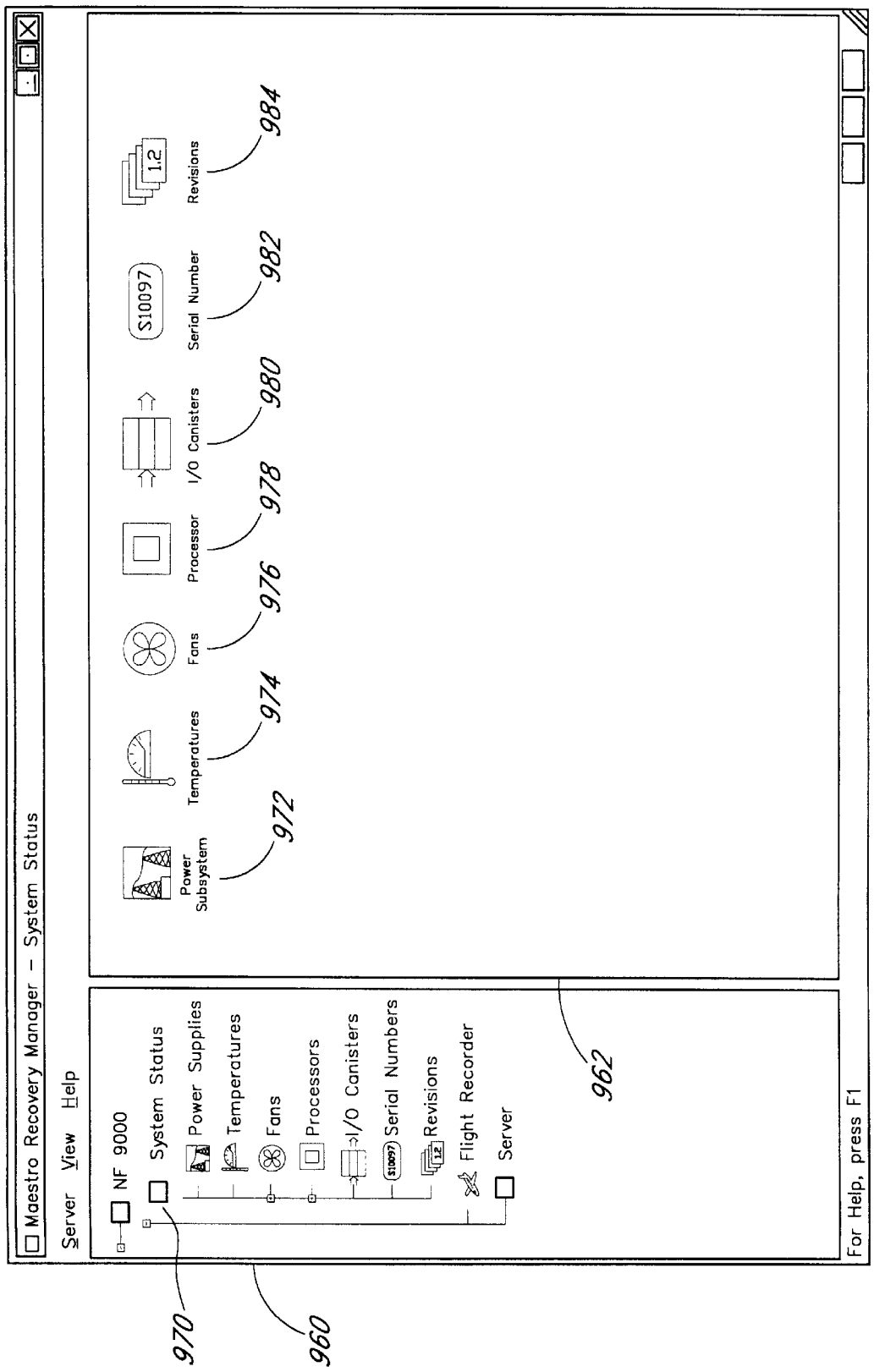
FIG. 17 is an exemplary screen display of a system status window seen at the client computer to control the microcontroller network of FIGS. 1 and 2.
Figure 18:
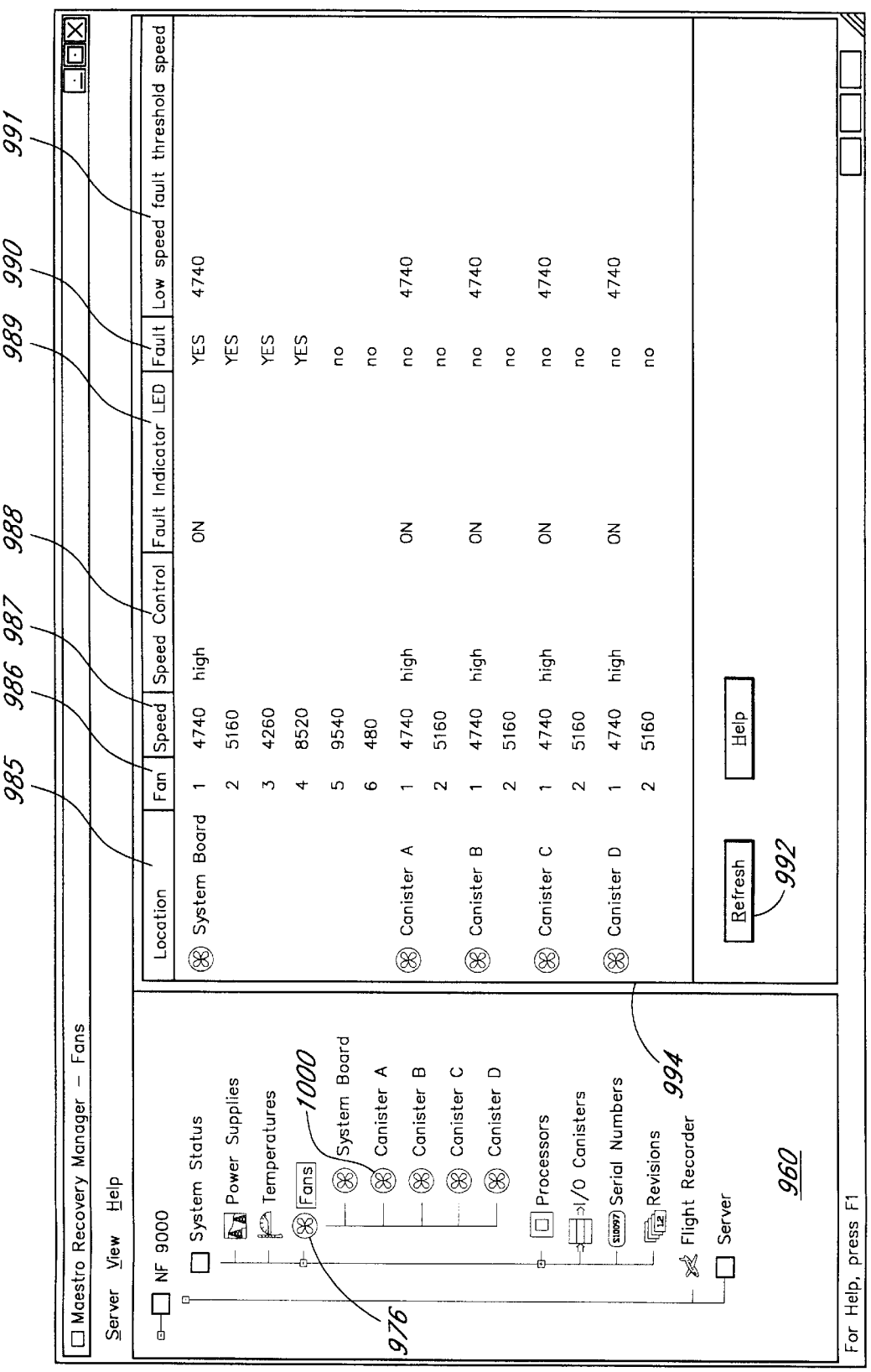
FIG. 18 is an exemplary screen display of a system status:fans window seen at the client computer to control the microcontroller network of FIGS. 1 and 2.

After successful modem communication has been established and the password confirmed at state 786, or at the completion of connecting the remote interface to the server and checking the password at state 792, process 770 continues at state 796. At state 796, the Recovery Manager software 130 will in one embodiment display a Recovery Manager window 960, which includes a System Status icon 970 as shown in FIG. 17. A System Status window panel 962 is not displayed at this time. The user at the client computer 122/124 then selects the System Status icon 970 on the display, such as by clicking the pointer device on the icon. Moving to state 798, the System Status window panel 962 (FIG. 17) is then displayed to the user. The user selects one of a multiple set of component icons 972–984 on the window panel 962 to initiate a System Status operation. In one embodiment, icon 972 is for Power Supplies, icon 974 is for Temperatures, icon 976 is for Fans, icon 978 is for Processor, icon 980 is for I/O Canisters, icon 982 is for Serial Numbers and icon 984 is for Revisions. When the user selects one of the icons 972–984, the Recovery Manager 130 displays a component window panel to the user, such as exemplary Fans window panel 994 (FIG. 18) if the user selected the Fans icon 976.

In one embodiment, the exemplary Fans window panel 994 (FIG. 18) includes several fields 985–991: field 985 is for Fan Location, field 986 is for Fan Number within the Location, field 987 is for Fan Speed (rpm, as detected by the microcontrollers 166 and 172 (FIG. 12)), field 988 is for Fan Speed Control (high or low), field 989 is for Fault Indicator LED (on or off), field 990 is for Fan Fault (yes or no), and field 991 is for Fan Low-speed Fault Threshold Speed (rpm). Note that this exemplary Fans window panel 994 includes a Refresh button 992 which triggers a retrieval of new values for the fields of the panel.

Figure 19:
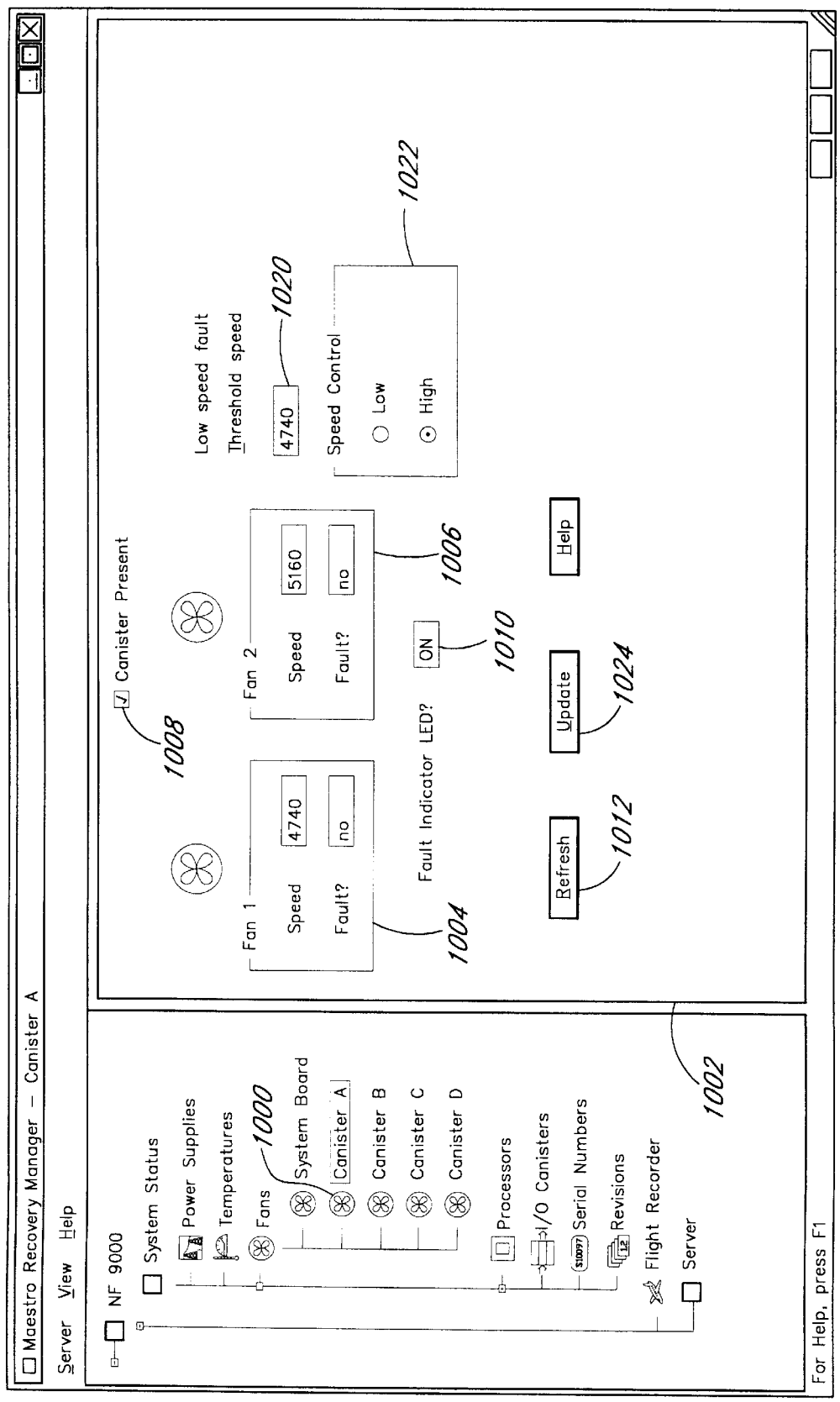
FIG. 19 is an exemplary screen display of a system status:fans:canister A window seen at the client computer to control the microcontroller network of FIGS. 1 and 2.

If the user selects a Canister A icon 1000 in the Recovery Manager window panel 960, the Recovery Manager 130 displays an exemplary Fans detail window panel 1002 (FIG. 19). This exemplary panel 1002 provides status information for the fans of the selected Canister A, which in this embodiment includes a status box 1004 for a Fan 1 and a status box 1006 for Fan 2 along with a Canister Present indicator 1008 and a Fault Indicator Led box 1010. These status items 1004–1010 are refreshed (new status information is retrieved) if the user selects a Refresh button 1012. A Fan Low-speed Fault Threshold Speed entry box 1020 and a Fan Speed Control radio button box 1022 allow the user to enter new values if it desired to change the current settings. An Update operation to change the values of the settings is initiated if the user selects the Update button 1024.

Continuing in FIG. 13a at decision state 799, process 770 determines if the Refresh Status operation is to be performed, if for example, the user selected a Refresh button on one of the System status windows. If so, process 770 proceeds to state 800 and initiates the Refresh operation to retrieve new status information for display to the user. If the Refresh operation is not selected, as determined at decision state 799, process 770 advances to decision state 801 to determine if the Update operation is to be performed, if for example, the user selected a Update button on one of the System status windows. If so, process 770 proceeds to state 802 and initiates the Update operation to update item settings that the user desires to change. At the completion of either state 800 or state 802, or if the user selects another status option (e.g., Help), process 670 proceeds through off page connector A 803 to state 804 on FIG. 13b.

At state 804, the Recovery Manager software 130 at the client computer 122/124 provides a microcontroller network command (based on selecting one of System Status operations (e.g., Update, Refresh)) and sends it to the communication layer software. Proceeding to state 806, the communication layer puts a communications protocol around the command (from state 804) and sends the encapsulated command to the server through the client modem 128, the server modem 126 and the remote interface 104. The encapsulated command is of the Request type 202 shown in FIG. 3. Process 770 then continues to a function 810 wherein the server receives the command and retrieves or updates the selected status information for the selected item(s), e.g., Fans. In one embodiment, for example, each Refresh request generates one response such that the Recovery Manager 130 generates multiple Refresh requests to retrieve the complete set of status information. Function 810 will be further described in conjunction with FIG. 14.

Moving to state 812, each of the responses generated by the server are then sent one at a time to the remote interface 104. Process 770 then proceeds to state 814 wherein the remote interface 104 sends each response back through the server modem 126 to the client modem 128. Alternatively, if a local connection 121 is utilized, each response is sent directly to the local client computer 122. Moving to state 822, the client modem 128 sends the response back to the Recovery Manager software 130 at the remote client computer 124. Proceeding to decision state 824, process 770 determines whether the executed command was a Retrieve (Refresh) or Update command. If the command was a Retrieve, process 770 moves to decision state 826 to determine if the Retrieve operation was successful. If so, process 770 continues to state 828 wherein the Recovery Manager 130 (FIG. 1) displays the new system status information in a System Status window panel (such as window panel 994 (FIG. 18) or window panel 1002 (FIG. 19)) on the display at the client computer 122/124. However, if the Refresh operation was not successful, process 770 proceeds to state 830 wherein the Recovery Manager 130 shows new status information for the items that the new status information has been successfully received (if any).

Returning to decision state 824, if the command was an Update, process 770 moves to decision state 834 to determine if the Update operation was successful. If so, process 770 continues to state 836 wherein the Recovery Manager 130 (FIG. 1) displays an Update Successful indication in the appropriate Status window. However, if the Update operation was not successful, process 770 proceeds to state 838 wherein the Recovery Manager 130 displays an Update Failure indication in the appropriate Status window. Moving to state 840, the details of the command information are available, if the user so desires, by selecting a Details button (not shown). At the completion of any of states 828, 830, 836 or 840, process 770 completes at end state 842.

Figure 14:
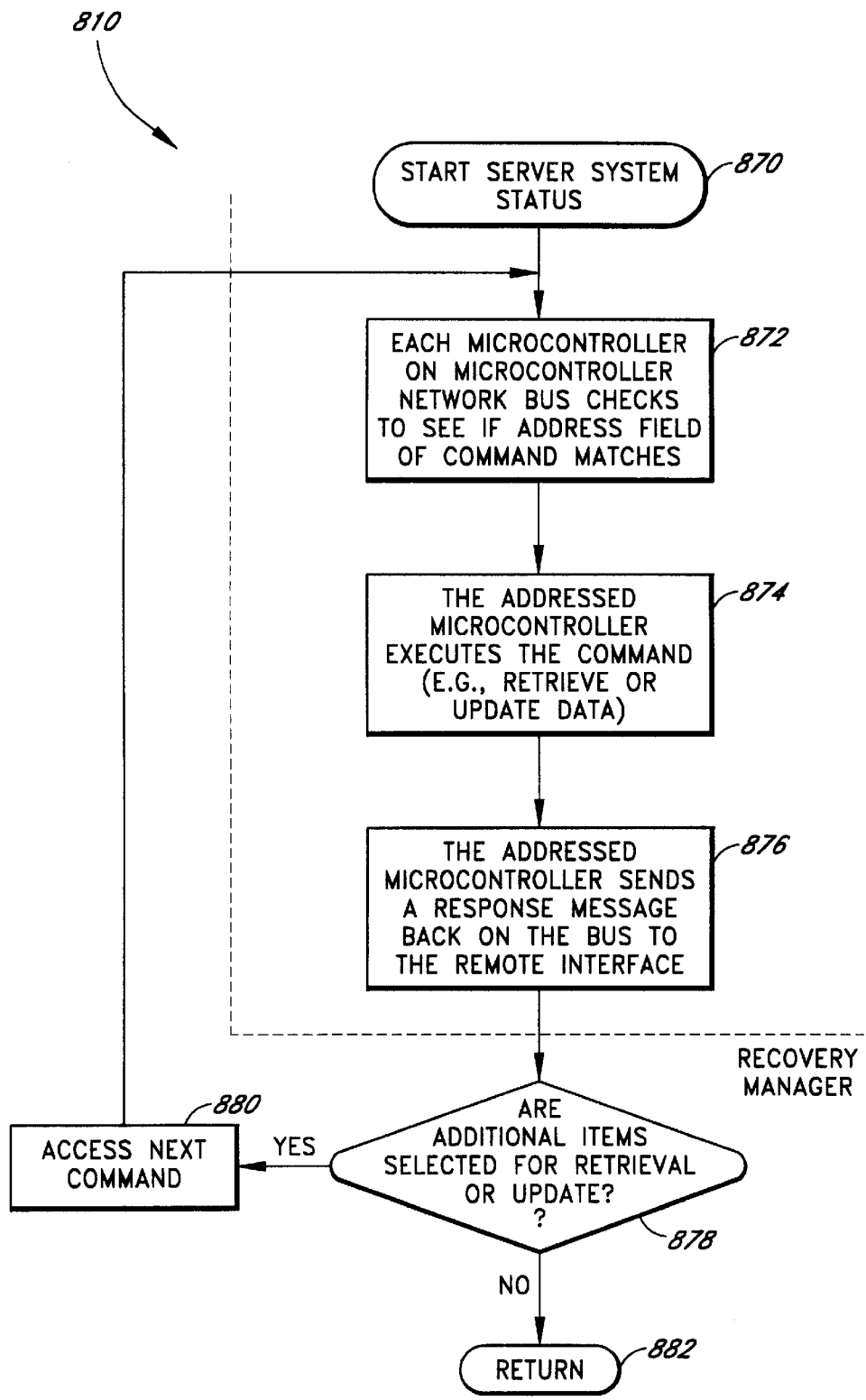
FIG. 14 is one embodiment of a flow diagram of the system status function shown in FIG. 13b.

Referring to FIG. 14, the Server System Status function 810 will now be described. Beginning at start state 870, function 810 proceeds to state 872 wherein each microcontroller on the microcontroller network bus 160 (FIG. 2) checks to see if the address field of the system command received from the recovery manager 130 (FIG. 1) at the client computer matches that of the microcontroller. Continuing at state 874, the addressed microcontroller executes a command, e.g., retrieve data or update data. Continuing at state 876 the addressed microcontroller sends a response message back on the microcontroller bus 160 to the controller that initiated the command, which is the remote interface controller 200 (FIG. 2) in this situation. Moving to decision state 878, function 810 determines whether additional items are selected for retrieval or update. If so, function 810 moves to state 880 to access the next command and then moves back to state 872 wherein each microcontroller again checks to see if it is addressed. The single addressed microcontroller performs states 872, 874 and 876. If there are no more items selected for retrieval or update, as determined at decision state 878, function 810 proceeds to a return state 882 where function 810 completes.

States 878, 880 and 882 are performed by the Recovery Manager 130 at the client computer 122/124. For example, if the user wanted system status on all the fans by selecting the Fan icon 976 (FIG. 18), the Recovery Manager 130 generates one command for each of a selected group of microcontrollers for retrieving fan information. Thus, a command to read fan information from CPU A controller 166 (FIG. 2) is sent out and a response received, followed by a command to and response from Canister A controller 172, and so on through Canister B controller 174, Canister C controller 176 and Canister D controller 178.

In one embodiment, the System Status windows provide the following status information:

System Status: Power Supplies

This window displays power supply status information. To obtain current information, click Refresh. This information includes:

Present: Indicates the power supply is installed and present

A.C.: Indicates whether the power supply is receiving A.C. power.

D.C.: Indicates whether the power supply is supplying D.C. voltage.

Power: Indicates the server is On or Off.

Output Voltages: Indicates the power (in volts) generated by each power supply line.

System Status: Temperature

This window displays information about the operational temperatures of the server. To obtain current temperature information, click Refresh. To apply any changes made in this window, click Update.

Temperature Sensor 1: Indicates the temperature measured by Sensor 1.

Temperature Sensor 2: Indicates the temperature measured by Sensor 2.

Temperature Sensor 3: Indicates the temperature measured by Sensor 3.

Temperature Sensor 4: Indicates the temperature measured by Sensor 4.

Temperature Sensor 5: Indicates the temperature measured by Sensor 5.

Warning Level: Shows the temperature warning level (in one embodiment, the default is 55 degrees Celsius). When any temperature sensor measures this level or higher, a warning is issued. To change the warning level, enter a new temperature and click Update.

Shutdown Level: Shows the temperature shutdown level (in one embodiment, the default is 70 degrees Celsius). When any temperature sensor measures this level or higher, the server is automatically shut down. To change the shutdown level enter a new temperature and click Update.

Show Temp in Degrees: Select whether the temperatures are in Celsius or Fahrenheit.

System Overtemp?: Indicates whether the server temperature is above the Warning threshold.

System Status: Fans

This window displays server and group fan status information. To obtain current status information, click Refresh. The information that appears in this window includes:

Location: Indicates the location of the fan. Options include System Board and Groups A or B.

Fans 1–6 (System Board), 1–2 (Group): Indicates the location of the fan. For information on the physical location, click here Location icon.

Speed: Displays the fan operating speed (in RPM).

Speed Control: Indicates the fan is operating at High or Low speed.

Fault Indicator LED: Indicates the Fan Fault LED on the server enclosure is On or Off.

Fault: Indicates whether the fan failed.

Low-speed Fault Threshold Speed: Displays the low-speed fault threshold speed. When a fan drops below this speed, the fan is reported as failed. To change failure level, enter a new speed (in RPM) and click Update. In one embodiment, the speed is entered in increments of 60 (e.g., 60, 120, 180, etc.).

Note: To view status information on a specific group of fans, change their speed, or modify the speed at which they are considered failed, double-click the fan group's icon.

System Board Fans

This window displays information about the status of the system board fans. To obtain current information, click Refresh. To apply any changes made in this window, click Update.

Group X Fans

This window displays information about the status of the fans in the selected group. To obtain current information, click Refresh. To apply any changes made in this window, click Update.

Canister X Fans

This window displays information about the status of the fans in the selected canister. To obtain current information, click Refresh. To apply any changes made in this window, click Update.

System Status: Processor

This window displays processor status information. To obtain current information, click Refresh. This information includes:

CPU 1–4: Indicates the location of the CPU.

Present: Indicates whether the CPU is installed.

Power: Indicates whether the system is receiving power.

Overtemp: Indicates whether the system is running above operating temperature.

Error: Indicates whether a CPU internal error occurred.

NMI Control: Indicates whether NMI control is active or inactive.

Any Fault?: Indicates whether faults or errors occurred on any installed processors.

Bus/Core Speed Ratio: Indicates the server's Bus/Core speed ratio, a relative indicator of processor performance.

CPU X Status

This window displays status information for the selected CPU. To obtain current information, click Refresh. To apply any changes made in this window, click Update.

Present: When selected, the CPU is installed.

Power: Indicates whether the system is receiving power.

Overtemp: Indicates whether the system is running above operating temperature.

Error: Indicates whether a CPU internal error occurred.

NMI Control: Indicates NMI control is active or inactive.

System Status: I/O Groups

This window displays I/O group status information. To obtain current information, click Refresh. This information includes:

PCI 1–4: Indicates whether a peripheral card is installed in the specified PCI slot.

PCI Power: Indicates whether the canister's PCI bus is receiving power.

System Status: I/O Canisters

This window displays I/O canister status information. To obtain current information, click Refresh. This information includes:

Status: Indicates the canister is inserted or removed.

PCI 1–4: Indicates whether a peripheral card is installed in the specified PCI slot.

PCI Power: Indicates whether the canister's PCI bus is receiving power.

System Status: Serial Numbers

This window lists the serial numbers of the system board, backplane, canisters, power supplies, and remote interface. To obtain current information, click Refresh.

System Status: Revisions

This window displays server component revision information for the backplane, system board, power supplies, I/O canisters or I/O groups, system interface and remote interface. To obtain current information, click Refresh.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

Appendix A

Incorporation by Reference of Commonly Owned Applications

The following patent applications, commonly owned and filed Oct. 1, 1997, are hereby incorporated herein in their entirety by reference thereto:

| Title | Application No. | Attorney Docket No. |
|---|---|---|
| "System Architecture for Remote Access and Control of Environmental Management" | 09/942,160 | MNFRAME.002A1 |
| "Method of Remote Access and Control of Environmental Management" | 09/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |

-continued

| Title | Application No. | Attorney Docket No. |
|---|---|---|
| "Diagnostic and Managing Distributed Processor System" | 08/942,402 | MNFRAME.005A1 |
| "Method for Managing a Distributed Process System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/942,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |

-continued

| Title | Application No. | Attorney Docket No. |
|---|---|---|
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A system for reading a system log for a computer, the system comprising:
a first computer;
a microcontroller capable of providing to the first computer a read system log signal;
a remote interface connected to the microcontroller; and
a second computer connected to the first computer via the remote interface and communicating a read system log command to the microcontroller.

2. The system defined in claim 1, wherein the first computer additionally comprises a log memory.

3. The system defined in claim 2, wherein the log memory is connected to the microcontroller.

4. The system defined in claim 2, wherein the microcontroller provides the read system log signal to the log memory.

5. The system defined in claim 1, wherein the remote interface includes an external port for connection to the second computer.

6. The system defined in claim 1, wherein the second computer is at the same location as the first computer.

7. The system defined in claim 1, wherein the second computer is at a location remote to the first computer.

8. The system defined in claim 7, additionally comprising a pair of modems, wherein a first modem connects to the first computer and a second modem connects to the second computer.

9. The system defined in claim 8, wherein each modem further connects to the public switched telephone network.

10. The system defined in claim 8, wherein each modem further connects to a cable network.

11. The system defined in claim 8, wherein each modem facilitates connection to a satellite.

12. The system defined in claim 1, wherein the remote interface includes a remote interface microcontroller that connects via a bus to the microcontroller.

13. The system defined in claim 2, wherein the remote interface is responsive to a command sent from the second computer to read the log memory.

14. The system defined in claim 2, wherein the first computer stores event information.

15. The system defined in claim 14, wherein the second computer displays the event information.

16. The system defined in claim 14, wherein the event information is stored in a system log.

17. The system defined in claim 16, wherein the system log is stored in the log memory.

18. The system defined in claim 16, wherein the system log is stored in a non-volatile, random access memory (NVRAM).

19. The system defined in claim 18, wherein the NVRAM is accessed by a microcontroller.

20. The system defined in claim 2, wherein the remote interface includes a power source independent of a power source for the first computer.

21. The system defined in claim 20, wherein the independent power source facilitates reading of the log memory when the first computer power source is inoperable or operating below a threshold power level.

22. The system defined in claim 2, wherein the first computer additionally comprises a real-time clock.

23. The system defined in claim 22, wherein the real-time clock is connected to the microcontroller.

24. The system defined in claim 22, wherein the real-time clock provides a time stamp that is stored in the log memory.

25. A system for reading a system log on a computer, the system comprising:
a log memory;
a microcontroller connected to the log memory;
a first computer storing event information in the log memory;
a remote interface connected to the microcontroller; and
a second computer connected to the first computer via the remote interface and communicating a read system log command to the microcontroller.

26. The system defined in claim 25, wherein the remote interface is connected to and proximately located to the first computer.

27. The system defined in claim 25, wherein the remote interface includes a power source independent of a power source for the first computer.

28. The system defined in claim 27, wherein the independent power source facilitates reading of the log memory when the first computer power source is inoperable or operating below a threshold power level.

29. The system defined in claim 25, wherein the second computer receives response data through the remote interface based on the results of the command.

30. The system defined in claim 29, wherein the remote interface comprises a circuit having a remote interface microcontroller and a remote interface memory, wherein the remote interface memory is connected to the remote interface microcontroller and stores the response data.

31. The system defined in claim 1, wherein the second computer receives response data through the remote interface based on the results of the read system log command.

32. The system of claim 31, wherein the remote interface includes a remote interface memory for storing the response data.

33. The system defined in claim 1, wherein the remote interface is connected to and proximately located to the first computer.

34. The system defined in claim 1, wherein the remote interface comprises a circuit having a remote interface microcontroller and a remote interface memory, wherein the remote interface memory is connected to the remote interface microcontroller.

35. A microcontroller network for diagnosing and managing the conditions of a computer, the microcontroller network comprising:

a microcontroller bus; and a plurality of microcontrollers that are interconnected by the microcontroller bus and wherein the microcontrollers manage the conditions of the computer, and wherein a selected one of the microcontrollers maintains a system log in a non-volatile random access memory.

36. A microcontroller network for diagnosing and managing the conditions of a computer, the microcontroller network comprising:

a memory;

a microcontroller bus; and a plurality of microcontrollers that are interconnected by the microcontroller bus, wherein a one of the microcontrollers is connected to the memory and stores information indicative of the conditions of the computer in the memory.

37. The microcontroller network of claim 36, wherein the one microcontroller maintains a system log in the memory.

38. The microcontroller network of claim 36, wherein the memory comprises a non-volatile random access memory.

* * * * *